(12) United States Patent
Sugawara et al.

(10) Patent No.: US 12,392,964 B2
(45) Date of Patent: Aug. 19, 2025

(54) OPTICAL FIBER FUSION SPLICER AND OPTICAL FIBER FUSION SPLICING METHOD

(71) Applicant: Fujikura Ltd., Tokyo (JP)

(72) Inventors: Hiroshi Sugawara, Sakura (JP); Koichi Yokota, Sakura (JP)

(73) Assignee: Fujikura Ltd., Tokyo (JP)

(*) Notice: Subject to any disclaimer, the term of this patent is extended or adjusted under 35 U.S.C. 154(b) by 119 days.

(21) Appl. No.: 18/021,426

(22) PCT Filed: Aug. 31, 2021

(86) PCT No.: PCT/JP2021/031960
§ 371 (c)(1),
(2) Date: Feb. 15, 2023

(87) PCT Pub. No.: WO2022/045364
PCT Pub. Date: Mar. 3, 2022

(65) Prior Publication Data
US 2023/0305231 A1    Sep. 28, 2023

(30) Foreign Application Priority Data
Aug. 31, 2020    (JP) .................... 2020-145838

(51) Int. Cl.
G02B 6/255    (2006.01)
(52) U.S. Cl.
CPC ......... G02B 6/2553 (2013.01); G02B 6/2551 (2013.01)
(58) Field of Classification Search
CPC .................. G02B 6/2551; G02B 6/2553
See application file for complete search history.

(56) References Cited

U.S. PATENT DOCUMENTS

2003/0007755 A1    1/2003 Morita et al.
2004/0071414 A1    4/2004 Liang et al.

FOREIGN PATENT DOCUMENTS

CN    1399150 A    2/2003
CN    1531661 A    9/2004
(Continued)

OTHER PUBLICATIONS

International Search Report issued in corresponding International Application No. PCT/JP2021/031960; mailed Dec. 23, 2021 (2 pages).

Primary Examiner — Omar R Rojas
(74) Attorney, Agent, or Firm — Osha Bergman Watanabe & Burton LLP

(57) ABSTRACT

An optical fiber fusion splicer includes: a replaceable groove-formed unit having first positioning grooves, separated from each other by an equal distance, on which first optical fibers are disposed, and second positioning grooves, separated from each other by an equal distance, on which second optical fibers are disposed, wherein the first optical fibers constitute a first mass fiber and have first glass parts, and the second optical fibers constitute a second mass fiber and have second glass parts; a lighting part that illuminates, with light, the first optical fibers and the second optical fibers; a lens that condenses the light passing through the first glass parts and the second glass parts; a camera that captures an image formed by the lens; and a pair of discharge electrodes that heat and melt, by electric discharge, the first glass parts and the second glass parts.

18 Claims, 9 Drawing Sheets

(56) References Cited

FOREIGN PATENT DOCUMENTS

| | | | |
|---|---|---|---|
| CN | 103348273 A | 10/2013 | |
| CN | 103733101 A | 4/2014 | |
| CN | 111142189 A | 5/2020 | |
| CN | 216285811 U | 4/2022 | |
| JP | S58203407 A | 11/1983 | |
| JP | H01217306 A | 8/1989 | |
| JP | H05119226 A | 5/1993 | |
| JP | H06051149 A | 2/1994 | |
| JP | H07287139 A | 10/1995 | |
| JP | H08021923 A | 1/1996 | |
| JP | 2577031 B2 * | 1/1997 | ........... G02B 6/2551 |
| JP | 2002169050 A | 6/2002 | |
| JP | 2002277671 A | 9/2002 | |
| JP | 2003057481 A | 2/2003 | |
| JP | 2003315599 A | 11/2003 | |
| JP | 2005017662 A | 1/2005 | |
| JP | 4429540 B2 | 3/2010 | |
| JP | 2013025239 A | 2/2013 | |
| JP | 2017142442 A | 8/2017 | |
| JP | 2018036262 A | 3/2018 | |
| KR | 10-2013-0136507 A | 12/2013 | |
| WO | 2014084043 A1 | 6/2014 | |

\* cited by examiner

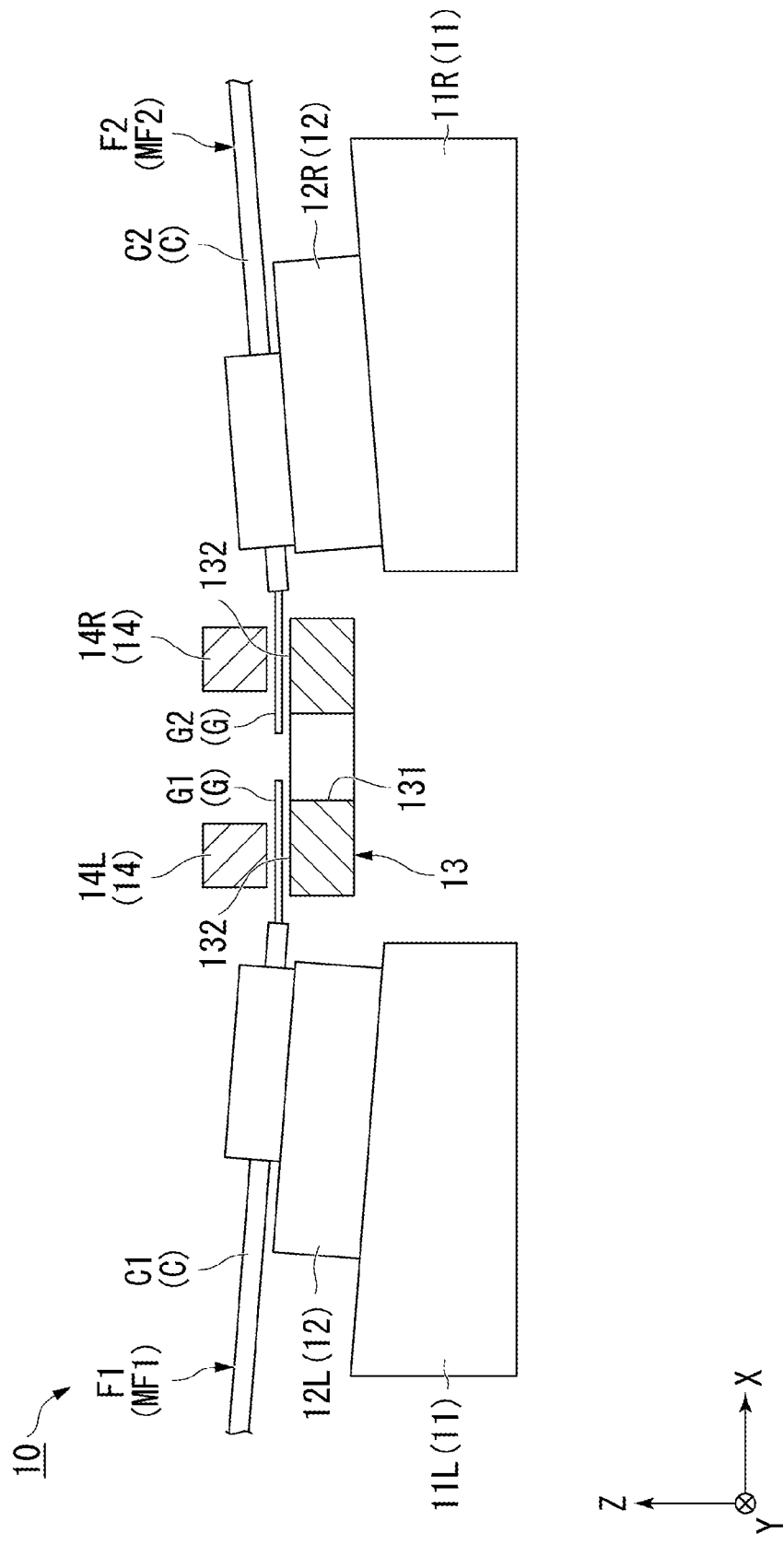

| | | FIBER PITCH | | |
|---|---|---|---|---|
| | | 165 μm | 200 μm | 250 μm |
| NUMBER OF OPTICAL FIBERS | 1 | | 11.0 | |
| | 2 | 15.0 | 14.0 | 13.5 |
| | 4 | 19.0 | 17.0 | 16.0 |
| | 6 | 22.0 | 19.5 | 18.5 |
| | 8 | 24.0 | 21.5 | 20.0 |

UNIT:mA

| | | FIBER PITCH | | |
|---|---|---|---|---|
| | | 165 μm | 200 μm | 250 μm |
| DIAMETER OF OPTICAL FIBER | 80 μm | 18.0 | 15.5 | 14.0 |
| | 125 μm | – | 24.0 | 22.0 |

UNIT:mA

OPTICAL FIBER FUSION SPLICER AND OPTICAL FIBER FUSION SPLICING METHOD

TECHNICAL FIELD

The present invention relates to an optical fiber fusion splicer and an optical fiber fusion splicing method.

This application claims priority from Japanese Patent Application No. 2020-145838 filed on Aug. 31, 2020, the contents of which are incorporated herein by reference in their entirety.

BACKGROUND

Patent Documents 1 and 2 each disclose an optical fiber fusion splicer that fusion-splices ends of a plurality of optical fibers (mass fiber) configuring one of fiber groups to ends of a plurality of optical fibers (mass fiber) configuring the other of fiber groups by electric discharge heating such that ends of a pair of fibers facing each other are spliced to each other. In the optical fiber fusion splicer, a method of changing a splicing condition (for example, an amount of voltage or electrical current) depending on the number of the optical fibers is disclosed. In Patent Document 3, an optical fiber fusion splicing method of changing a splicing condition depending on a diameter of an optical fiber is disclosed.

PATENT LITERATURE

[PTL 1]
  Japanese Unexamined Patent Application, First Publication No. H7-287139
[PTL 2]
  Japanese Unexamined Patent Application, First Publication No. H5-119226
[PTL 3]
  Japanese Patent No. 4429540

However, regarding a mass fiber that is conventionally and widely used, the number of the kinds of mass fibers was low, and the number of the kinds of distances between centers of the optical fibers adjacent to each other (hereinafter, referred to as a fiber pitch) was also low. In recent years, mass fibers with various specification are used, and the number of the kinds of fiber pitches also increases. For example, a mass fiber is also used which has a plurality of the number of kinds of different fiber pitches but not have all the same fiber pitch.

However, in the optical fiber fusion splicers and the fusion splicing methods of Patent Documents 1 to 3, since the splicing condition is set only by the number of optical fibers and the diameters thereof, a pair of mass fibers may not be fusion-spliced to each other by an appropriate splicing condition. In the case in which the splicing condition is inappropriate, a connection loss increases in the mass fibers that were subjected to fusion-splicing.

SUMMARY

One or more embodiments of the invention provide an optical fiber fusion splicer and an optical fiber fusion splicing method which can fusion-splice optical fibers under a splicing condition in accordance with a fiber pitch.

An optical fiber fusion splicer according to one or more embodiments of the invention includes: a replaceable groove-formed unit having a plurality of first positioning grooves and a plurality of second positioning grooves, the first positioning grooves causing a plurality of first optical fibers to be arranged at an equal distance (i.e., the first positioning grooves are separated from each other by an equal distance), the second positioning grooves causing a plurality of second optical fibers to be arranged at an equal distance (i.e., the second positioning grooves are separated from each other by an equal distance), the first optical fibers constituting a first mass fiber and having a plurality of first glass parts, the second optical fibers constituting a second mass fiber and having a plurality of second glass parts; a lighting part that illuminates, with light, the first optical fibers and the second optical fibers which are arranged on the groove-formed unit; a lens that condenses the light passing through the first glass parts, regions around the first glass parts, the second glass parts, and regions around the second glass parts; a camera that captures an image formed by the lens; a pair of discharge electrodes that heat and melt, by electric discharge, the first glass parts of the first optical fibers and the second glass parts of the second optical fibers which are arranged on the groove-formed unit; a high-voltage-generating circuit that generates an electric discharge between the pair of the discharge electrodes; a movable stage that moves the first optical fibers in a longitudinal direction of the first mass fiber and moves the second optical fibers in a longitudinal direction of the second mass fiber; an image processor that, based on the image captured by the camera, acquires at least one of a fiber pitch of the first optical fibers and a fiber pitch of the second optical fibers; and a splicing condition processor that sets a splicing condition corresponding to the acquired fiber pitch by selection or calculation thereof.

In the aforementioned optical fiber fusion splicer, the splicing condition processor sets a splicing condition corresponding to the fiber pitch acquired by the image processor. Consequently, the first optical fibers constituting the first mass fiber can be fusion-spliced one-to-one to the second optical fibers constituting the second mass fiber under a splicing condition in accordance with a fiber pitch.

In the optical fiber fusion splicer according to the above described embodiments of the invention, the image processor determines the number of the first optical fibers and the number of the second optical fibers based on the image, and the splicing condition processor may set the splicing condition corresponding to the fiber pitch of the first optical fibers, the fiber pitch of the second optical fibers, the number of the first optical fibers, and the number of the second optical fibers by selection or calculation thereof.

In the optical fiber fusion splicer according to the above described embodiments of the invention, based on the image, the image processor acquires at least one of diameters of the first optical fibers or at least one of diameters of the second optical fibers, and the splicing condition processor may set the splicing condition corresponding to the fiber pitch of the first optical fibers and the diameters of the first optical fibers by selection or calculation thereof, or, sets the splicing condition corresponding to the fiber pitch of the second optical fibers and the diameters of the second optical fibers by selection or calculation thereof.

In the optical fiber fusion splicer according to the above described embodiments of the invention, based on the image, the image processor acquires at least one of diameters of the first optical fibers and at least one of diameters of the second optical fibers, and the splicing condition processor may set the splicing condition corresponding to the fiber pitch of the first optical fibers, the fiber pitch of the second optical fibers, the diameters of the first optical fibers, and the diameters of the second optical fibers by selection or calculation thereof.

An optical fiber fusion splicing method according to one or more embodiments of the invention uses an optical fiber fusion splicer and fusion-splices a first mass fiber and a second mass fiber. The optical fiber fusion splicer includes: a replaceable groove-formed unit having a plurality of first positioning grooves and a plurality of second positioning grooves, the first positioning grooves causing a plurality of first optical fibers to be arranged at an equal distance, the second positioning grooves causing a plurality of second optical fibers to be arranged at an equal distance, the first optical fibers constituting a first mass fiber and having a plurality of first glass parts, the second optical fibers constituting a second mass fiber and having a plurality of second glass parts; a lighting part that illuminates, with light, the first optical fibers and the second optical fibers which are arranged on the groove-formed unit; a lens that condenses the light passing through the first glass parts, regions around the first glass parts, the second glass parts, and regions around the second glass parts; a camera that captures an image formed by the lens; a pair of discharge electrodes that heat and melt, by electric discharge, the first glass parts of the first optical fibers and the second glass parts of the second optical fibers which are arranged on the groove-formed unit; a high-voltage-generating circuit that generates an electric discharge between the pair of the discharge electrodes; and a movable stage that moves the first optical fibers in a longitudinal direction of the first mass fiber and moves the second optical fibers in a longitudinal direction of the second mass fiber, the fusion splicing method including: acquiring a fiber pitch of the first optical fibers and a fiber pitch of the second optical fibers, based on the image captured by the camera; and setting a splicing condition corresponding to the acquired fiber pitch by selection or calculation thereof.

In the aforementioned optical fiber fusion splicing method, a splicing condition corresponding to the fiber pitch acquired based on the image captured by the camera is set. Consequently, the first optical fibers constituting the first mass fiber can be fusion-spliced one-to-one to the second optical fibers constituting the second mass fiber under a splicing condition in accordance with a fiber pitch.

In the optical fiber fusion splicing method according to the above described embodiments of the invention, the splicing condition may be set before the first mass fiber is fusion-spliced to the second mass fiber.

In the optical fiber fusion splicing method according to the above described embodiments of the invention, the number of the first optical fibers and the number of the second optical fibers are determined based on the image, and the splicing condition corresponding to the fiber pitch of the first optical fibers, the fiber pitch of the second optical fibers, the number of the first optical fibers, and the number of the second optical fibers may be set by selection or calculation thereof.

In the optical fiber fusion splicing method according to the above described embodiments of the invention, at least one of diameters of the first optical fibers or at least one of diameters of the second optical fibers is acquired based on the image, and the splicing condition corresponding to the fiber pitch of the first optical fibers and the diameters of the first optical fibers may be set by selection or calculation thereof, or, the splicing condition corresponding to the fiber pitch of the second optical fibers and the diameters of the second optical fibers may be set by selection or calculation thereof.

In the optical fiber fusion splicing method according to the above described embodiments of the invention, at least one of diameters of the first optical fibers and at least one of diameters of the second optical fibers is acquired based on the image, and the splicing condition corresponding to the fiber pitch of the first optical fibers, the fiber pitch of the second optical fibers, the diameters of the first optical fibers, and the diameters of the second optical fibers may be set by selection or calculation thereof.

According to the invention, the first optical fibers constituting the first mass fiber can be fusion-spliced one-to-one to the second optical fibers constituting the second mass fiber under a splicing condition in accordance with a fiber pitch.

BRIEF DESCRIPTION OF THE DRAWINGS

FIG. 1 is a view showing an optical fiber fusion splicer according to first embodiments when viewed from a front-back direction and is a schematic cross-sectional view showing the optical fiber fusion splicer.

FIG. 13 is a view showing an example of a table that represents relationships of fiber pitches, the number of optical fibers, and intensities of electric discharge in an optical fiber fusion splicer according to one or more embodiments.

FIG. 14 is a view showing an example of a table that represents relationships of fiber pitches, diameters of optical fibers, and intensities of electric discharge in an optical fiber fusion splicer according to one or more embodiments.

DETAILED DESCRIPTION

First Embodiments

Hereinafter, an optical fiber fusion splicer according to first embodiments of the invention will be described with reference to FIGS. 1 to 10.

Figure 2A:
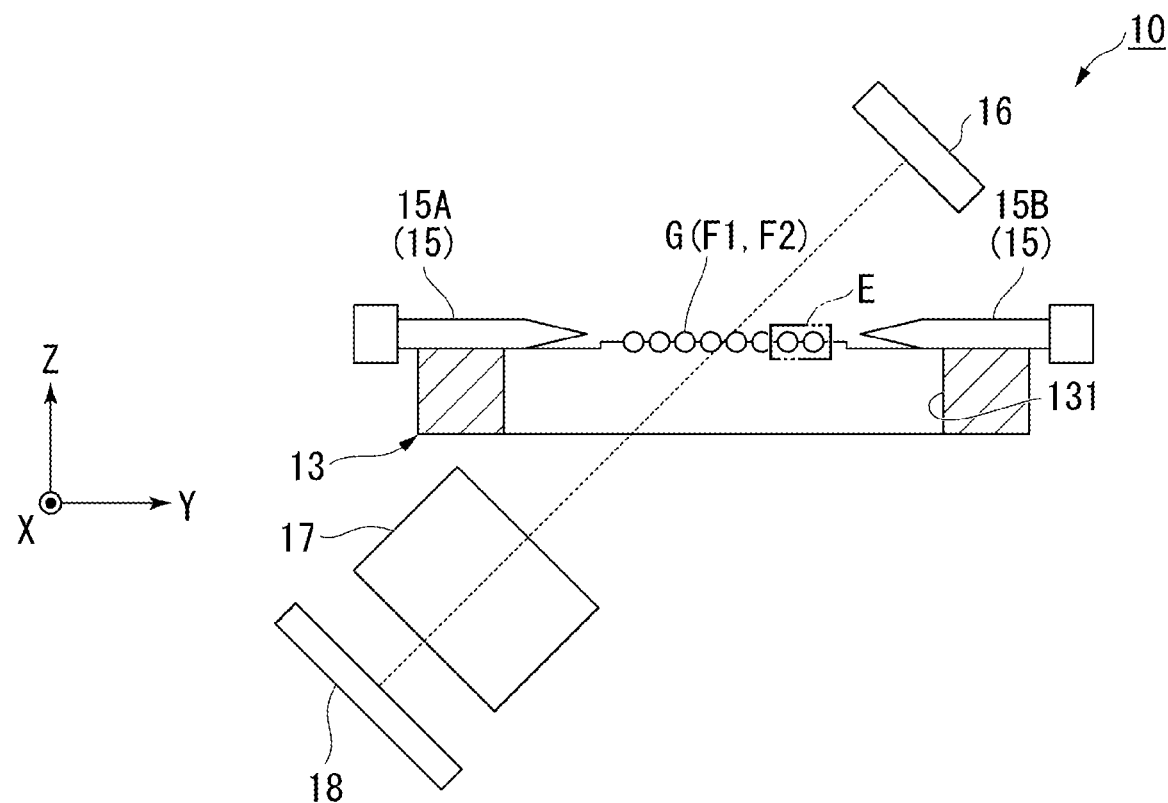
FIG. 2A is a view showing the optical fiber fusion splicer according to the first embodiments when viewed from a horizontal direction and is a schematic cross-sectional view showing the optical fiber fusion splicer.
Figure 2B:
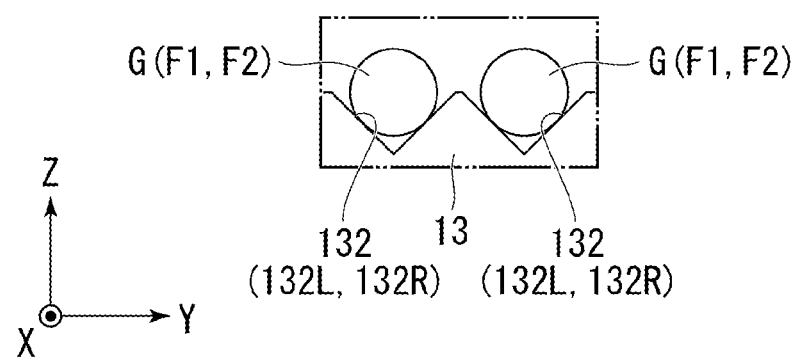
FIG. 2B is a view showing the relevant part of the optical fiber fusion splicer according to the first embodiments and is a schematic enlarged cross-sectional view showing the part represented by reference letter E of FIG. 2A.

An optical fiber fusion splicer 10 according to the first embodiments shown in FIGS. 1, 2A, and 2B is configured to fusion-splice two mass fibers (a first mass fiber and a second mass fiber). Specifically, the optical fiber fusion splicer 10 correspondingly fusion-splices one first optical fiber of a plurality of first optical fibers constituting the first mass fiber and one second optical fiber of a plurality of second optical fibers constituting the second mass fiber. Accordingly, the optical fiber fusion splicer 10 is configured to fusion-splice the first optical fibers constituting the first mass fiber and the second optical fibers constituting the second mass fiber.

Here, "one first optical fiber is correspondingly fusion-spliced to one second optical fiber" means that, one first optical fiber and one second optical fiber face each other before fusion-splicing, and in this state, one first optical fiber is fusion-spliced to one second optical fiber. Furthermore, the first optical fibers are the first mass fiber and may be referred to as a first fiber group. The second optical fibers are the second mass fiber and may be referred to as a second fiber group.

In the following explanation, "fusion-splicing a plurality of first optical fibers to a plurality of second optical fibers such that one first optical fiber is correspondingly fusion-spliced to one second optical fiber" may be simply referred to as "fusion-splicing a plurality of first optical fibers to a plurality of second optical fibers".

In the specification, an optical fiber F1 corresponds to a first optical fiber of the invention, and the optical fiber F1 is referred to as "first optical fiber F1". The optical fibers F1 constitute a first mass fiber MF1.

An optical fiber F2 corresponds to a second optical fiber, and the optical fiber F2 is referred to as "second optical fiber F2". The optical fibers F2 constitute a second mass fiber MF2. Each of the optical fibers F1 and F2 includes a glass part G and a coated part C coating the glass part G.

That is, the first optical fiber F1 includes a first glass part G1 and a first coated part C1 coating the first glass part G1. The second optical fiber F2 includes a second glass part G2 and a second coated part C2 coating the second glass part G2.

In one or more embodiments, the first mass fiber MF1 is formed of eight optical fibers F1 (a first-ordered fiber F1, a second-ordered fiber F1, . . . , to eighth-ordered fiber F1).

Similarly, the second mass fiber MF2 is formed of eight optical fiber F2 (a first-ordered fiber F2, a second-ordered fiber F2, . . . , to eighth-ordered fiber F2).

In one or more embodiments, the eight optical fibers F1 are fusion-spliced one-to-one to the eight optical fibers F2.

In the embodiments described below, the case in which the number of optical fibers constituting each of the first mass fiber MF1 and the second mass fiber MF2 is eight will be described.

In the invention, the number of optical fibers is not limited to eight. The number of optical fibers may be less than eight or may be greater than eight. That is, the number N of optical fibers needs to be an integer greater than two. In other words, each of the first mass fiber MF1 and the second mass fiber MF2 is formed of a plurality of fibers of the first-ordered fiber to the N-ordered fiber.

In the optical fiber fusion splicer 10, it is possible to collectively fusion-splice the optical fibers F1 and F2 which constitutes the mass fibers MF1 and MF2. The optical fibers F1 may be linked to form the mass fiber in a state of being arranged in a line but the optical fibers F1 may not be linked. The same applies to the optical fibers F2.

The optical fiber fusion splicer 10 includes a pair of movable stages 11 (a first movable stage 11L and a second movable stage 11R), a pair of fiber holders 12 (a first fiber holder 12L and a second fiber holder 12R), a groove-formed unit 13, a pair of fiber clamps 14 (a first fiber clamp 14L and a second fiber clamp 14R), and a pair of discharge electrodes 15 (a first discharge electrode 15A and a second discharge electrode 15B). The direction in which the pair of the movable stages 11 (11L, 11R) align and the direction in which the pair of the discharge electrodes 15 (15A, 15B) align are orthogonal to each other.

In the specification, the direction in which the pair of the movable stages 11 (11L, 11R) align is represented by the X-axis and may be referred to as the horizontal direction X. Furthermore, the direction in which the pair of the discharge electrodes 15 (15A, 15B) align is represented by the Y-axis and may be referred to as the front-back direction Y. Moreover, the direction orthogonal to both the horizontal direction X and the front-back direction Y is represented by the Z-axis and may be referred to as the vertical direction Z.

The horizontal direction X is also the direction in which the optical fibers F1 and F2 extend. Additionally, the front-back direction Y is also the direction in which the optical fibers F1 and F2 align.

The pair of the movable stages 11 (11L, 11R) are spaced apart at a distance in the horizontal direction X. Each movable stage 11 is driven by a drive source (not shown in the drawings) such as an actuator or the like, and therefore is movable in the horizontal direction X on a base which is not shown in the drawings. In the horizontal direction X, the pair of the movable stages 11 (11L, 11R) are movable in a direction in which they approach each other or in a direction in which they move separately from each other.

The pair of the fiber holders 12 (12L, 12R) are configured to grasp the optical fibers F1 and F2 including the coated parts C (C1, C2), respectively. The fiber holder 12 (12L, 12R) can grasp the mass fibers MF1 and MF2. That is, the first fiber holder 12L located at the left side in FIG. 1 can grasp the mass fiber MF1. The second fiber holder 12R located at the right side in FIG. 1 can grasp the mass fiber MF2. The paired fiber holders 12 (12L, 12R) are removably fixed to the paired movable stages 11 (11L, 11R), respectively. In a state in which the fiber holders 12 (12L, 12R) grasping the optical fibers F1 and F2 are fixed to the movable stages 11 (11L, 11R), the longitudinal directions of the optical fibers F1 and F2 are directed to the horizontal direction X. In this state, the movable stages 11 (11L, 11R) can cause the optical fibers F1 and F2 to move in the longitudinal directions of the optical fibers F1 and F2.

The above-described fiber holders 12 (12L, 12R) may be, for example, non-detachable from the movable stages 11 (11L, 11R). That is, the fiber holder 12 may be provided to be integrated together with the movable stage 11.

Figure 3:
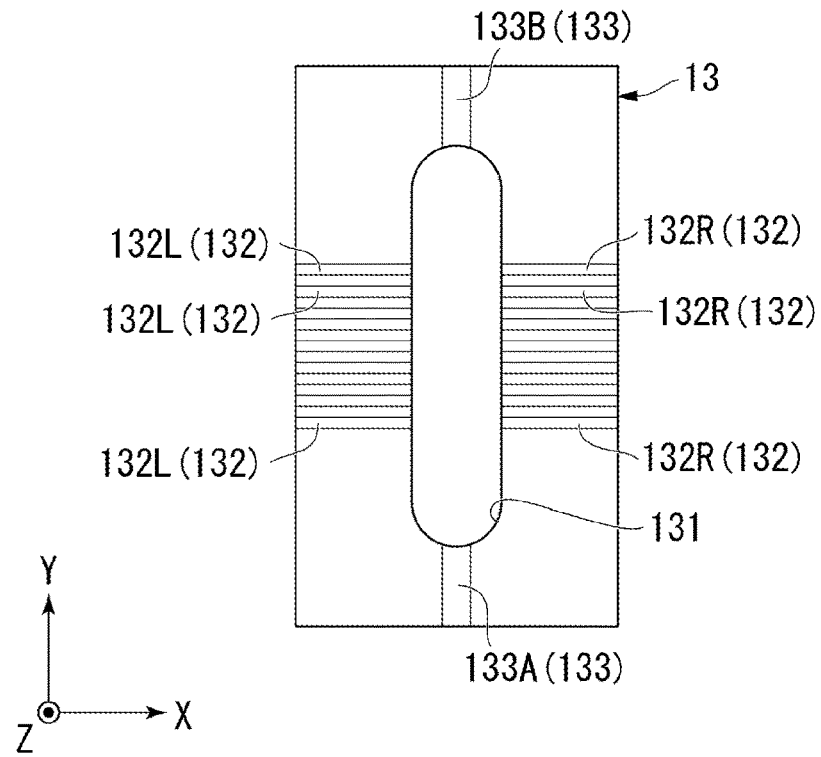
FIG. 3 is a view when viewed from the upper side of a groove-formed unit provided in the optical fiber fusion splicer shown in FIGS. 1 and 2A and is a plan view showing the groove-formed unit.

The groove-formed unit 13 is disposed on a base which is not shown in the drawings and is located between the pair of the movable stages 11 (11L, 11R) in the horizontal direction X. As shown in FIGS. 1 to 3, the groove-formed unit 13 has a through-hole 131 that penetrates therethrough in the vertical direction Z and formed therein. The groove-formed unit 13 has positioning grooves 132. Specifically, in FIG. 3, the groove-formed unit 13 has first positioning grooves 132L located at the left side and second positioning grooves 132R located at the right. The positioning grooves 132 (132L, 132R) are formed on an upper surface of the groove-formed unit 13 at both regions of the through-hole 131 in the horizontal direction X. The positioning grooves 132 (132L, 132R) expand in the horizontal direction X. In FIG. 2B, the shape of the positioning groove 132 is a V-shaped groove (V-groove) in cross section but may be, for example, a U-shaped groove or a trapezoid-shaped groove. As shown in FIGS. 1, 2A, 2B, and 4, the glass parts G exposed at front-end portions of the optical fibers F1 and F2 extending from the fiber holders 12 (12L, 12R) are disposed in the positioning grooves 132 (132L, 132R).

Figure 4:
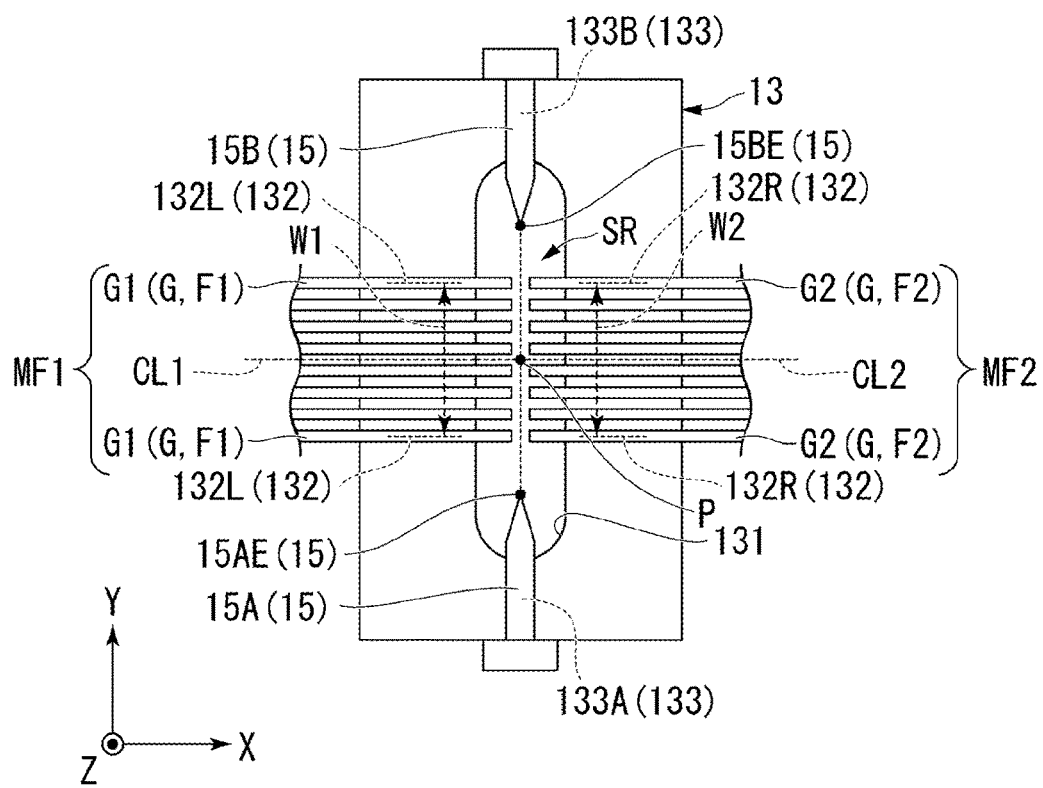
FIG. 4 is a view showing a state in which a pair of discharge electrodes and glass parts of a pair of mass fibers are arranged in the groove-formed unit shown in FIG. 3.

Specifically, in FIG. 4, the first glass parts G1 exposed at the front-end portions of the optical fiber F1 are disposed in the first positioning grooves 132L located at the left side. Similarly, the second glass part G2 exposed at the front-end portions of the optical fiber F2 are disposed in the second positioning grooves 132R located at the right. Consequently, the positioning grooves 132 can fix the glass parts G1 and G2 of the optical fibers F1 and F2 in position (alignment). In FIG. 1, the groove-formed unit 13 is shown by the cross-sectional view passing through the bottom portion (refer to FIG. 2B) of the positioning groove 132 and being orthogonal to the front-back direction Y. Therefore, although the glass parts G (G1, G2) are away from the positioning grooves 132 in FIG. 1, practically, as shown in FIG. 2B, the glass parts G are in contact with the inner surfaces of the positioning grooves 132.

As shown in FIG. 3, the positioning grooves 132 (132L, 132R) aligns in the front-back direction Y at both sides of the through-hole 131. The positioning grooves 132 (132L, 132R) which align in the front-back direction Y are arranged at an equal distance. Accordingly, as shown in FIG. 4, the glass parts G1 of the optical fibers F1 can be disposed in the respective positioning grooves 132L, and the glass parts G2 of the optical fibers F2 can be disposed in the respective positioning grooves 132R. For this reason, it is possible to align the glass parts G1 and G2 of the optical fibers F1 and F2 at an equal distance.

The groove-formed unit 13 is detachable from a base which is not shown in the drawings. That is, the groove-formed unit 13 is replaceable. Therefore, in the optical fiber fusion splicer 10, a groove-formed unit selected from a plurality of kinds of groove-formed units 13 which are prepared in advance can be used. A plurality of kinds of groove-formed units 13 includes, for example, a groove-formed unit having different distances (pitches) between centers of the positioning grooves 132 adjacent to each other in the front-back direction Y, a groove-formed unit having different numbers of the positioning grooves 132 which align in the front-back direction Y, and a groove-formed unit having different widths of the positioning grooves 132 in the front-back direction Y. By replacement of the groove-formed unit 13, it is possible to change the fiber pitch of the optical fibers F1 and F2, the number of the optical fibers F1 and F2, and the diameter of the optical fibers F1 and F2, which are handled by the optical fiber fusion splicer 10. The "fiber pitch of the optical fibers F1 and F2" means a distance between centers of the first optical fibers F1 adjacent to each other or a distance between centers of the second optical fibers F2 adjacent to each other. That is, "the fiber pitch of the optical fibers F1 and F2" means the fiber pitch of the first optical fibers and the fiber pitch of the second optical fibers. In the following explanation, "a plurality of fiber pitches" may be simply referred to as "fiber pitch".

The groove-formed unit 13 that fixes the glass parts G (first glass part G1, second glass part G2) of the pair of the optical fibers F1 and F2 in position so as to cause them to face each other may be, for example, separately formed of two groove-formed units (first groove-formed unit, second groove-formed unit) in the horizontal direction X. In this case, the first groove-formed unit and the second groove-formed unit needs to have the positioning grooves 132L and 132R, respectively.

The pair of the fiber clamps 14 (14L, 14R) are located above the groove-formed unit 13 and are configured to open or close with respect to the upper surface of the groove-formed unit 13. The pair of the fiber clamps 14 (14L, 14R) open or close with respect to the upper surface of the groove-formed unit 13 at both regions of the through-hole 131 in the horizontal direction X. By closing the fiber clamp 14 with respect to the upper surface of the groove-formed unit 13, the glass parts G1 and G2 of the optical fibers F1 and F2 are held between the groove-formed unit 13 and the fiber clamps 14 (14L, 14R), and therefore it is possible to prevent the glass parts G (G1, G2) from being removed from the positioning grooves 132 (132L, 132R) upward. Note that, even in a state in which the fiber clamp 14 is closed with respect to the upper surface of the groove-formed unit 13, a closing force of the fiber clamp 14 is set such that the glass parts G1 and G2 of the optical fibers F1 and F2 can move in the longitudinal direction of the positioning grooves 132 (132L, 132R) (horizontal direction X). The closing force of the fiber clamp 14 is determined by, for example, a spring or a magnet which applies a force to the fiber clamp 14 to be directed to the groove-formed unit 13, the weight of the fiber clamp 14, or the like.

As shown in FIGS. 2A, 2B, and 4, the pair of the discharge electrodes 15 (15A, 15B) are arranged and spaced apart at a distance in the front-back direction Y. The pair of the discharge electrodes 15 (15A, 15B) are located so as to sandwich a region between the first positioning grooves 132L and the second positioning grooves 132R which face each other in the horizontal direction X in the groove-formed unit 13 and so as to sandwich the positioning grooves 132 in the front-back direction Y. Additionally, the pair of the discharge electrodes 15 are located at both sides of the through-hole 131 in the front-back direction Y. The pair of the discharge electrodes 15 (15A, 15B) may be fixed in position to the groove-formed unit 13 by being disposed on electrode grooves 133 (133A, 133B) formed on the upper surface of the groove-formed unit 13 as shown in, for example, FIGS. 3 and 4.

In a state in which the optical fibers F1 and F2 facing each other in the horizontal direction X are arranged on the groove-formed unit 13, the ends (ends overlapping the through-hole 131 as shown in FIG. 4) of the pair of the glass parts G1 and G2 of the optical fibers F1 and F2 are heated and melted by the electric discharge generated between the pair of the discharge electrodes 15 described above.

A positional relationship of the discharge electrodes 15 (15A, 15B) and the mass fibers MF1 and MF2 will be particularly described.

The discharge electrode 15A has an electrode end 15AE (first electrode end). The discharge electrode 15B has an electrode end 15BE (second electrode end). The electrode end 15AE faces the electrode end 15BE in the front-back direction Y.

In FIG. 4, in the front-back direction Y, reference numeral W1 means a distance between the centers (glass part G1) of the two optical fiber F1 located outside the first mass fiber MF1 in the front-back direction Y. Specifically, of the eight optical fibers F1 constituting the first mass fiber MF1 and arranged in the front-back direction Y, reference numeral W1 corresponds to a distance between the position of the center of the optical fiber F1 (the glass part G1 of the first-ordered optical fiber F1) closest to the electrode end 15AE and the position of the center of the optical fiber F1 (the glass part G1 of the eighth-ordered optical fiber F1) closest to the electrode end 15BE. The middle position of the distance W1 is represented by reference numeral CL1.

Reference numeral W2 means a distance between the centers (glass part G2) of the two optical fiber F2 located outside the second mass fiber MF2 in the front-back direction Y. Specifically, of the eight optical fibers F2 constituting the second mass fiber MF2 and arranged in the front-back direction Y, reference numeral W2 corresponds to a distance between the position of the center of the optical fiber F2 (the glass part G2 of the first-ordered optical fiber F2) closest to the electrode end 15AE and the position of the center of the optical fiber F2 (the glass part G2 of the eighth-ordered optical fiber F2) closest to the electrode end 15BE. The middle position of the distance W2 is represented by reference numeral CL2.

As shown in FIG. 4, the eight optical fibers F1 forming the first mass fiber MF1 and the eight optical fibers F2 forming the second mass fiber MF2 are arranged in the region SR sandwiched between the electrode end 15AE and the electrode end 15BE. Specifically, the eight optical fibers F1 and the eight optical fibers F2 are arranged such that the eight optical fibers F1 correspond one-to-one to the eight optical fibers F2 in a center region between the electrode end 15AE and the electrode end 15BE, that is, in the center of the region SR.

In other words, the middle position CL1 of the distance W1 of the first mass fiber MF1 coincides with the middle position CL2 of the distance W2 of the second mass fiber MF2 at the midpoint P in the front-back direction Y. The midpoint P is located at a substantially center of a virtual line connecting the electrode end 15AE and the electrode end 15BE.

Here, the term "located at a substantially center" means that, as long as the effect of achieving optimization of the amount of heat to be received by the optical fibers F1 and F2 due to electric discharge is obtained, the midpoint P may be slightly displaced from the center position of the virtual line connecting the electrode end 15AE and the electrode end 15BE.

As shown in FIG. 2A, the optical fiber fusion splicer 10 further includes a lighting part 16, a lens 17, and a camera 18. The lighting part 16 illuminates, with light, the glass parts G1 and G2 of the optical fibers F1 and F2 which are arranged on the groove-formed unit 13. The lighting part 16 is disposed above the groove-formed unit 13. The light of the lighting part 16 illuminates the glass parts G1 and G2 of the optical fibers F1 and F2 (refer to FIG. 4) located to overlap the through-hole 131 of the groove-formed unit 13 in the vertical direction Z and passes through the through-hole 131. The lens 17 condenses light of the lighting part 16 which passes through the glass parts G1 and G2 of the optical fibers F1 and F2 and the regions around the glass parts G1 and G2. The camera 18 obtains an image formed by the lens 17 and captures the image. As shown in FIG. 2A as an example, the optical fiber fusion splicer 10 may include one optical system configured by the lighting part 16, the lens 17, and the camera 18, but may include, for example, two optical systems. In the case in which the optical fiber fusion splicer 10 includes two optical systems, for example, two lighting parts 16 may illuminate, with light, the glass parts G1 and G2 of the optical fibers F1 and F2 in two directions different from each other. An image including the glass parts G1 and G2 of the optical fibers F1 and F2 may be captured in two axes (two directions) in the directions in which (from the positions at which) two lenses 17 and two the cameras 18 are disposed. In this case, an image including the glass parts G1 and G2 of the optical fibers F1 and F2 can be further accurately obtained.

Figure 5:
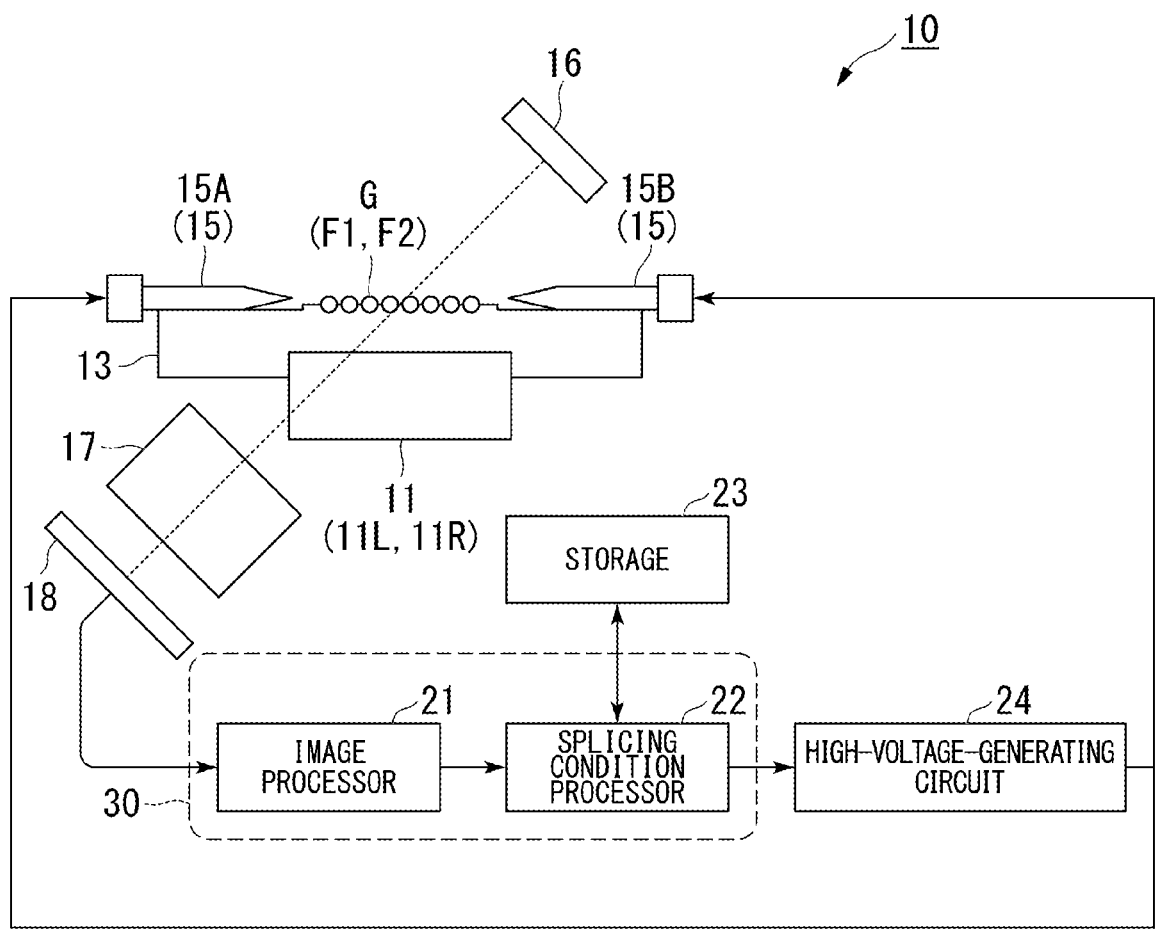
FIG. 5 is a block diagram explaining a function of the optical fiber fusion splicer according to the first embodiments.

As shown in FIG. 5, the optical fiber fusion splicer 10 further includes an image processor 21, a splicing condition processor 22, a storage 23, and a high-voltage-generating circuit 24. The image processor 21 and the splicing condition processor 22 may constitute, for example, a condition-setting device 30 which will be described later.

Based on the image captured by the camera 18, the image processor 21 acquires at least one of a fiber pitch of the first optical fibers F1 and a fiber pitch of the second optical fibers F2. The splicing condition processor 22 sets a splicing condition corresponding to the fiber pitch acquired by the image processor 21 by selection or calculation thereof.

Each of the image processor 21 and the splicing condition processor 22 is a computer including, for example, a circuit such as an electrical circuit or an electronic circuit, a storage device, a CPU (Central Processing Unit), or the like. The computer carries out an acquisition processing of acquiring the image captured by the camera 18. Furthermore, the computer carries out an arithmetic processing, a calculation processing, a determination processing, a selection processing, a setting processing, or the like based on the image (image information) obtained by the acquisition processing. The computer may be operated in accordance with, for example, a computer program that executes the above-described processings. The computer program may be stored, for example, in the image processor 21, the splicing condition processor 22, and the storage 23.

The storage 23 is connected to the splicing condition processor 22. The storage 23 may constitute part of the above-described computer.

(Method of Calculating Fiber Pitch by Image Processor 21)

A method of calculating a fiber pitch by image processor 21 will be specifically described with reference to FIGS. 6 and 7.

Figure 6:
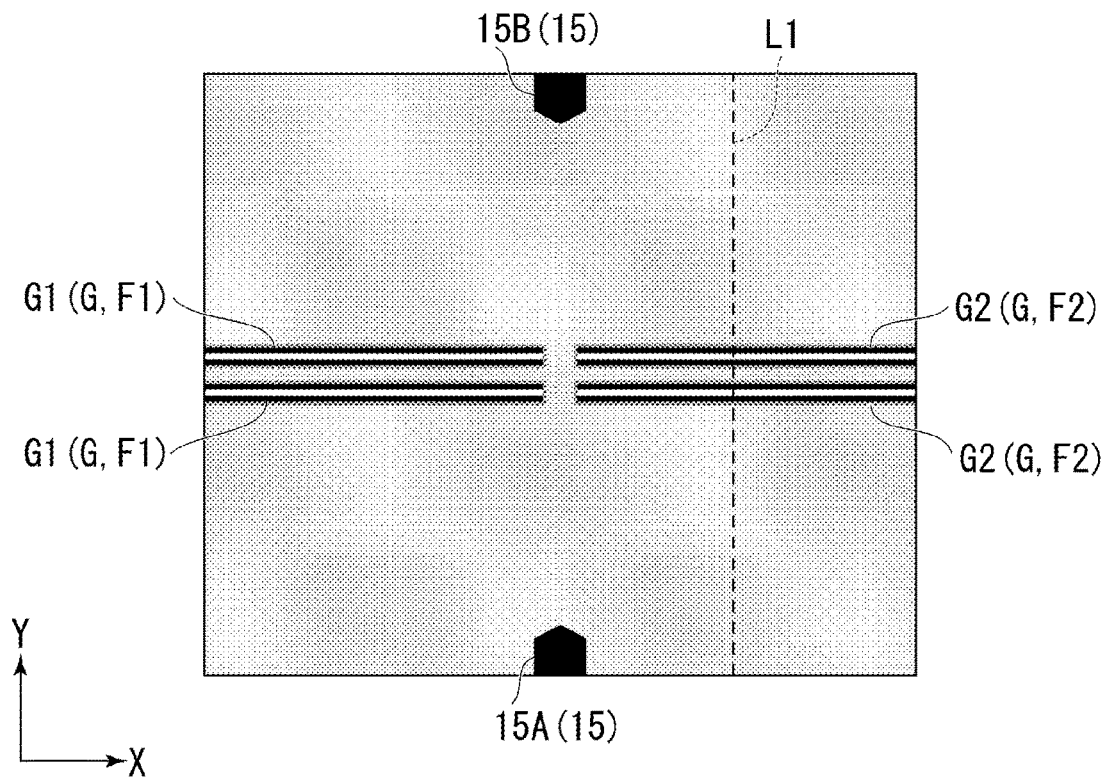
FIG. 6 is a view showing an example of an image captured by a camera provided in the optical fiber fusion splicer shown in FIGS. 2A and 5.

In order to acquire a fiber pitch, as shown in FIG. 6 as an example, the image processor 21 obtains the image showing a plurality of (for example, two in the drawing) first optical fibers F1 and a plurality of second optical fibers F2 which are arranged in the front-back direction Y. In the image shown in FIG. 6, the glass parts G1 and G2 of two pairs of the optical fibers F1 and F2 before being fusion-spliced and the pair of the discharge electrodes 15 are shown. The glass parts G1 of the plurality (two) of the optical fibers F1 are arranged and spaced apart at a distance in the front-back direction Y, and the glass parts G2 of the plurality (two) of the optical fibers F2 are arranged and spaced apart at a distance in the front-back direction Y.

In the image shown in FIG. 6, a degree of luminance for each pixel is represented in grayscale, with the higher degree of luminance in white, and the lower degree of luminance in black. In the image shown in FIG. 6, a high degree of the luminance of the center of the glass part G in the front-back direction Y (radial direction of the glass part G) is high, and a high degree of the luminance of both ends of the glass part G in the front-back direction Y is low. The reason for this is that, the cross-section of the glass part G orthogonal to the longitudinal directions of the optical fibers F1 and F2 (horizontal direction X) is circular in shape, and when the light of the lighting part 16 passes through the glass part G in the radial direction of the glass part G, the light is condensed to the center of the glass part G.

Next, the image processor 21 obtains a profile of luminance in the direction in which the glass parts G2 of the second optical fibers F2 align (in the front-back direction Y) at the position on the line segment L1 shown in FIG. 6 on the obtained image. The line segment L1 is a line extending in the front-back direction Y. The position of the line segment L1 in the horizontal direction X needs to be set at the position at which the glass parts G1 and G2 of the optical fibers F1 and F2 are present in the horizontal direction X. That is, the line segment L1 is necessary to not be set at the position of the gap between the pair of the optical fibers F1 and F2 which align in the horizontal direction X. As shown in FIG. 6, in the case in which the line segment L1 is set so as to overlap the plurality (two) of the second optical fibers F2, it is possible to acquire the fiber pitch of the second optical fibers F2. In the case in which the line segment L1 is set so as to overlap the plurality (two) of the first optical fibers F1, it is possible to acquire the fiber pitch of the first optical fibers F1. The image processor 21 may acquire only one of the fiber pitch of the first optical fibers F1 and the fiber pitch of the second optical fibers F2. Furthermore, the image processor 21 may acquire both the fiber pitch of the first optical fibers F1 and the fiber pitch of the second optical fibers F2.

Figure 7:
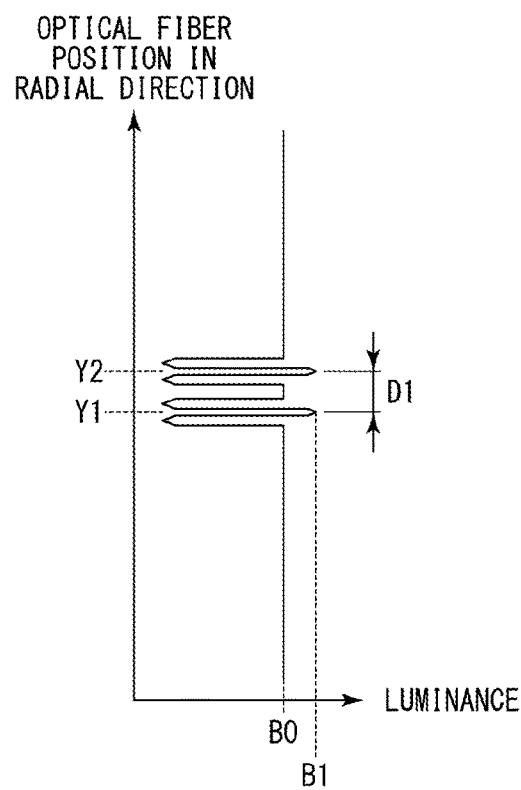
FIG. 7 is a graph showing a profile of luminance at the line segment L1 of the image shown in FIG. 6.

FIG. 7 shows a profile of luminance at the line segment L1 shown in FIG. 6. In FIG. 7, the vertical axis represents a position in the front-back direction Y (radial direction of the optical fibers F1 and F2), and the horizontal axis represents luminance. Moreover, the luminance value B0 is a luminance value of light that is light of the lighting part 16 reaching the camera 18 without passing through the glass part G. The luminance value B1 is a luminance value of condensed light at the center of the glass part G in the front-back direction Y due to passing through the glass part G having a circular cross section from the lighting part 16, and is higher than the luminance value B0.

The image processor 21 specifies two positions Y1 and Y2 corresponding to the luminance value B1 in the front-back direction Y based on the profile of the obtained luminance and acquires the distance D1 between the two positions Y1 and Y2. The image processor 21 determines the distance D1 as a fiber pitch. The determined fiber pitch is output from the image processor 21 to the splicing condition processor 22. That is, for example, the fiber pitch is determined based on the distance D1 between the first optical fibers F1 adjacent to each other in the front-back direction Y or the distance D1 between of the second optical fibers F2 adjacent to each other in the front-back direction Y.

(Modified Example of Method of Calculating Fiber Pitch)

The method of calculating a fiber pitch is not limited to the above-mentioned embodiments.

Next, a modified example of a method of calculating a fiber pitch will be described.

In the modified example the following conditions are necessary.

The optical fibers F1 are arranged in the front-back direction Y at an equal distance.

The optical fibers F2 are arranged in the front-back direction Y at an equal distance.

The diameters K1 of the optical fibers F1 are the same as each other.

The diameters K2 of the optical fibers F2 are the same as each other.

Under the conditions, for example, a fiber pitch may be acquired based on the number N1 of the optical fibers F1 and the distance W1 between the two optical fibers F1 (the first-ordered optical fiber F1 and the eighth-ordered optical fiber F1) of the optical fibers F1 forming the first mass fiber MF1 which are located at both ends of the first mass fiber MF1 in the front-back direction Y.

The modified example will be particularly described with reference to FIGS. 4, 6, and 7. Similar to the aforementioned embodiments, firstly, an image shown in FIG. 6 is obtained. The image processor 21 sets a position of a line segment L1 on the image so as to intersect with the optical fibers F1. The image processor 21 detects the number of the positions shown with a high luminance on the line segment L1 intersecting with the optical fibers F1. Although it is detected that the number of fibers is two (Y1, Y2) in the example shown in FIG. 7, the image processor 21 detects that the number N1 of the optical fiber is eight in the case of the first mass fiber MF1 shown in FIG. 4.

Furthermore, the image processor 21 detects positons of the two optical fibers (the first-ordered optical fiber F1 and the eighth-ordered optical fiber F1) of the eight optical fibers F1 which are located at both ends of the first mass fiber MF1 in the front-back direction Y. The image processor 21 acquires the distance W1 shown in FIG. 4 based on the detection result.

Moreover, the image processor 21 calculates the fiber pitch of the optical fiber F1 based on the diameter K1, the distance W1, and the number N1 which information associated with the optical fibers F1 and are obtained as described above.

The fiber pitch of the optical fiber F2 may be calculated by a similar way as in the above method. Particularly, the image processor 21 sets a position of a line segment L1 on the image so as to intersect with the optical fibers F2 and detects the number of the positions shown with a high luminance on the line segment L1. The image processor 21 detects that the number N2 of the optical fiber is eight in the case of the second mass fiber MF2 shown in FIG. 4.

Furthermore, the image processor 21 detects positons of the two optical fibers (the first-ordered optical fiber F2 and the eighth-ordered optical fiber F2) of the eight optical fibers F2 which are located at both ends of the second mass fiber MF2 in the front-back direction Y. The image processor 21 acquires the distance W2 shown in FIG. 4 based on the detection result. Moreover, the image processor 21 calculates the fiber pitch of the optical fiber F2 based on the diameter K2, the distance W2, and the number N2 which information associated with the optical fibers F2 and are obtained as described above.

Note that, regarding the numbers N1 and N2 of the optical fibers, the numbers N1 and N2 do not need to be acquired by automatic detection of the image processor 21. For example, an operator handling the optical fiber fusion splicer 10 may directly input the numbers N1 and N2 of the optical fibers to the optical fiber fusion splicer 10.

(Method of Setting Splicing Condition by Splicing Condition Processor 22)

Figure 8:
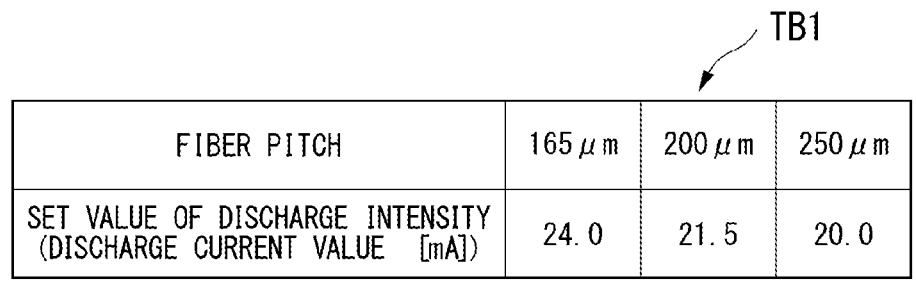
FIG. 8 is a view showing an example of a table that represents relationships between fiber pitches and intensities of electric discharge in the optical fiber fusion splicer according to the first embodiments.

The splicing condition processor 22 sets a splicing condition corresponding to the acquired fiber pitch. The setting of the splicing condition is carried out before fusion-splicing the pair of the optical fibers F1 and F2 which face each other in the horizontal direction X. Specifically, the splicing condition processor 22 selects a splicing condition corresponding to the fiber pitch from information (condition data) representing a relationship between a fiber pitch and a splicing condition. The information is stored in the storage 23 in advance. In the first embodiments, as shown in FIG. 8, the information representing the relationship between the fiber pitch and the splicing condition is a table TB1 showing a fiber pitch and a splicing condition which correspond to each other. In the table TB1, set values of intensities of electric discharge which are different from each other are set for each fiber pitch.

In the table TB1 shown in FIG. 8, current values (discharge current value) flowing between the pair of the discharge electrodes 15 are adopted as splicing conditions. The current value is one of the parameters which control intensity of electric discharge. Note that, in the table TB1 shown in FIG. 8, instead of the current value, for example, a voltage value applied between the pair of the discharge electrodes 15, an electric power value supplied to the pair of the discharge electrodes 15, or the like may be adopted as another parameter that controls intensity of electric discharge.

The table TB1 shown in FIG. 8 can be prepared, for example, based on the results by searching a set value of optimal intensity of electric discharge in advance by experiments or the like with regard to a plurality of kinds of fiber pitches which are assumed to be practically used. Although three kinds of fiber pitches are shown in FIG. 8 as an example, the kinds of fiber pitches of the invention are not limited to three.

The splicing condition processor 22 sets the splicing condition by reading out, from the table TB1, the set value of the intensity of electric discharge (in FIG. 8, current value) which corresponds to the fiber pitch acquired by the image processor 21. For example, in the case in which the fiber pitch acquired by the image processor 21 is "165 μm", the splicing condition processor 22 reads out, from the table TB1, the set value of "24.0 mA" for intensity of electric discharge. The splicing condition processor 22 outputs the set splicing condition (set value of intensity of electric discharge) to the high-voltage-generating circuit 24.

In the embodiments described above, the case is explained in which the splicing condition processor 22 refers to the table TB1 and thereby selects and sets an appropriate splicing condition; however, the splicing condition processor 22 may set an optimal splicing condition by determining the splicing condition by calculation. For example, a calculation formula including parameters such as air temperature, atmosphere pressure, degree of humidity, or the like in addition to the fiber pitch is determined in advance by experiments or the like, and an optimal splicing condition may be calculated and set using the calculation formula when fusion splicing is practically carried out.

The high-voltage-generating circuit 24 shown in FIG. 5 generates electric discharge between the pair of the discharge electrodes 15 in accordance with the set value of intensity of electric discharge which is output from the splicing condition processor 22.

Next, an example of an optical fiber fusion splicing method of fusion splicing a plurality of optical fibers F1 and a plurality of optical fibers F2 using the optical fiber fusion splicer 10 will be described.

When the optical fibers F1 and the optical fibers F2 are fusion spliced using the optical fiber fusion splicer 10, as shown in FIGS. 1 and 2A, firstly, the first fiber holder 12L grasping the optical fibers F1 is fixed on the first movable stage 11L. Similarly, the second fiber holder 12R grasping the optical fibers F2 is fixed on the second movable stage 11R. Additionally, the glass parts G1 exposed from the coated parts C1 at the front-end portions of the optical fibers F1 extending from the fiber holder 12L are arranged on the positioning grooves 132L of the groove-formed unit 13 (refer to FIG. 4). The glass parts G2 exposed from the coated parts C2 at the front-end portions of the optical fibers F2 extending from the fiber holder 12R are arranged on the positioning grooves 132R of the groove-formed unit 13 (refer to FIG. 4). Next, the pair of the fiber clamps 14 (14L, 14R) are closed, the glass parts G1 and G2 of the optical fibers F1 and the optical fibers F2 are grasped by the groove-formed unit 13 such that the glass part G1 of one optical fiber of the optical fibers F1 and the glass part G2 of one optical fiber of the optical fibers F2 face each other and thereby form a pair.

Thereafter, the pair of the movable stages 11 (11L, 11R) move in the horizontal direction X such that the front-end portions of the glass parts G1 and G2 of the optical fibers F1 and the optical fibers F2 overlap the through-hole 131 of the groove-formed unit 13 in the vertical direction Z. Accordingly, the positions of the front-end portions of the glass parts G1 and G2 of the optical fibers F1 and the optical fibers F2 in the horizontal direction are adjusted. Furthermore, gaps between the front-end portions of the glass parts G1 and G2 of the optical fibers F1 and the optical fibers F2 which face each other are adjusted by movement of the pair of the movable stages 11 (11L, 11R) in the horizontal direction X. The adjustment of the positions of the front-end portions of the glass parts G1 and G2 in the horizontal direction X may be carried out with reference to the image captured by the camera 18 (for example, the image shown in FIG. 6).

Thereafter, the image processor 21 acquires the fiber pitches of the optical fibers F1 and F2 based on the image obtained by the camera 18. The image processor 21 needs to acquire at least one of the fiber pitch of the first optical fibers F1 and the fiber pitch of the second optical fibers F2. The image processor 21 outputs the acquired fiber pitch to the splicing condition processor 22.

Subsequently, the splicing condition processor 22 reads out, from the table TB1 stored in the storage 23, the set value of intensity of electric discharge which serves as the splicing condition corresponding to the acquired fiber pitch, and outputs it to the high-voltage-generating circuit 24.

Finally, based on the set value of intensity of electric discharge which is output from the splicing condition processor 22, the optical fibers F1 are fusion-spliced to the optical fibers F2 such that one first optical fiber and one second optical fiber which form a pair are fusion-spliced. At this time, the pair of the movable stages 11 (11L, 11R) move in the direction in which they come close to each other, and the first glass parts G are butt-jointed to the second glass parts G such that one first glass part G1 corresponds to one second glass part G2. In this state, the high-voltage-generating circuit 24 generates electric discharge between the pair of the discharge electrodes 15 in accordance with the set value of intensity of electric discharge which is output from the splicing condition processor 22, and therefore the glass parts G1 and G2 are heated and melted. Consequently, the first glass parts G1 and the second glass parts G2 are combined together and fusion-spliced. Note that, when fusion-splicing is carried out, for example, electric discharge is generated between the pair of the discharge electrodes 15 until a predetermined time elapses before the first glass parts G1 are butt-jointed to the second glass parts G2, and thereafter the first glass parts G1 may be butt-jointed to the second glass parts G2.

As described above, according to the optical fiber fusion splicer 10 of the first embodiments and the optical fiber fusion splicing method using the optical fiber fusion splicer 10, the set value of the intensity of electric discharge (splicing condition) which corresponds to the fiber pitch is set based on the image obtained from the camera 18. Accordingly, it is possible to fusion-splice the optical fibers F1 and the optical fibers F2 under an optimal splicing condition in accordance with the fiber pitch of the optical fibers F1 and the fiber pitch of the optical fibers F2. This point will be described with reference to FIGS. 9 and 10.

Figure 9:
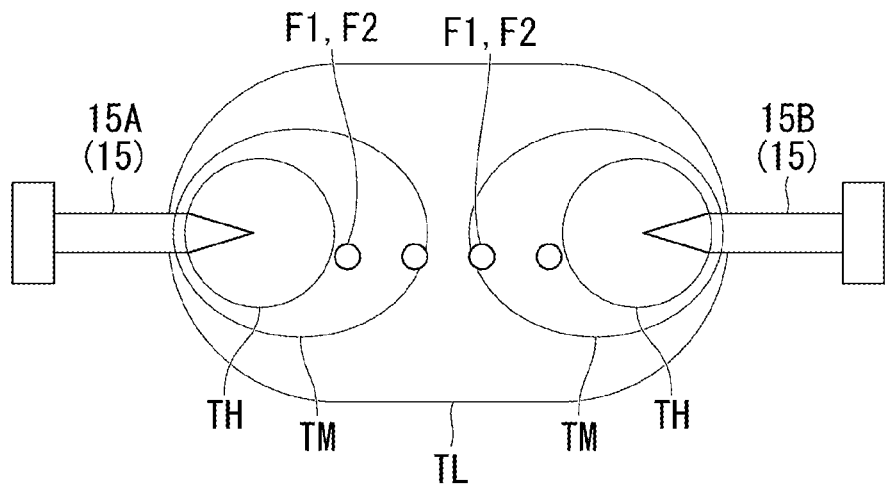
FIG. 9 is a view showing a first example of relationships between the positions of optical fibers in the case in which fiber pitches are large and a profile of a temperature region due to electric discharge generated between a pair of discharge electrodes.
Figure 10:
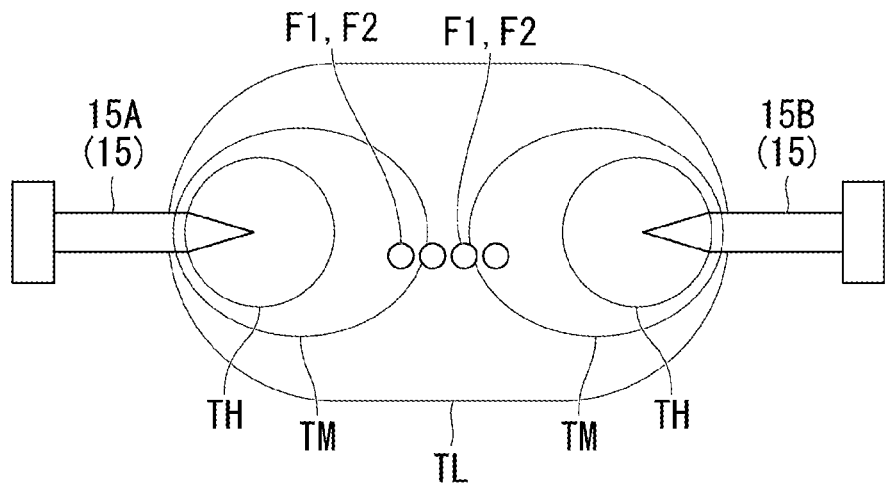
FIG. 10 is a view showing a second example of relationships between the positions of optical fibers having a fiber pitch smaller than that of the first example and a profile of a temperature region due to electric discharge generated between a pair of discharge electrodes.

FIGS. 9 and 10 schematically show a profile of a temperature region due to electric discharge (gaseous discharge) generated between the pair of the discharge electrodes 15.

The temperature region shown in FIGS. 9 and 10 includes a high temperature region TH, a medium-temperature region TM and a low-temperature region TL as relative temperature classification of the regions in which discharge occurs. The high temperature region TH is located at and around the front-end portion of each discharge electrode 15 and is a region having the highest temperature in the regions in which discharge occurs. The medium-temperature region TM is located outside the high temperature region TH and is a region having a temperature lower than that of the high temperature region TH. The low-temperature region TL is located further outside the medium-temperature region TM and is a region having a temperature lower than that of the medium-temperature region TM.

Since the same splicing condition such as intensity of electric discharge or the like are applied to both FIGS. 9 and 10, FIGS. 9 and 10 have the same temperature region profile.

FIGS. 9 and 10 are different from each other in the fiber pitches of the optical fibers F1 and F2. The fiber pitch is large in the example shown in FIG. 9, and the fiber pitch is small in the example shown in FIG. 10. In the example shown in FIG. 9, since the fiber pitch is large, all of the optical fibers F1 and F2 are located in substantially the medium-temperature region TM. In contrast, in the example shown in FIG. 10, since the fiber pitch is small, a part of the optical fibers F1 and F2 is located in the low-temperature region TL. Consequently, in the example shown in FIG. 10, the amount of heat to be received by the optical fibers F1 and F2 due to electric discharge is smaller than that of the example shown in FIG. 9. For this reason, if it is assumed that the amount of heat to be received by the optical fibers F1 and F2 due to electric discharge is optimal for fusion splicing in the case of the example shown in FIG. 9, the amount of heat to be received by the optical fibers F1 and F2 due to electric discharge is lacking in the case of the example shown in FIG. 10. Furthermore, although not shown in the drawings, in the case in which the fiber pitch is larger than that of the example shown in FIG. 9, the amount of heat to be received by the optical fibers F1 and F2 due to electric discharge becomes excessive. In the case in which the amount of heat to be received by the optical fibers F1 and F2 is inappropriate, a connection loss of the optical fibers F1 and F2 increases after fusion splicing.

In contrast, in the first embodiments, since the set value of intensity of electric discharge is changed in accordance with the fiber pitch, a temperature region profile due to the electric discharge generated between the pair of the discharge electrodes 15 can be changed in accordance with the fiber pitch. Accordingly, even in the case in which the fiber pitch is changed, it is possible to achieve optimization of the amount of heat to be received by the optical fibers F1 and F2 due to electric discharge. That is, it is possible to fusion-splice the optical fibers F1 and the optical fibers F2 under the optimal splicing condition in accordance with the fiber pitch of the optical fibers F1 and F2. Therefore, it is possible to suppress a connection loss of the optical fibers F1 and F2 to be small after fusion splicing.

Furthermore, according to the first embodiments, even in the case in which the fiber pitches of the optical fibers F1 and F2 to be fusion-spliced are changed, it is possible to suppress a loss of operation time for fusion-splicing.

For specific explanation, in an optical fiber fusion splicer that does not have a function of setting an optimal intensity of electric discharge in accordance with the fiber pitch, it is necessary to calibrate the intensity of electric discharge such that the amount of heat to be received by the optical fibers F1 and F2 due to electric discharge becomes adequate for each timing of changing a fiber pitch. Consequently, an operation time for fusion-splicing becomes unnecessarily longer. In contrast, in the first embodiments, an optimal intensity of electric discharge in accordance with the fiber pitch is set. For this reason, an additional operation for calibrating an intensity of electric discharge in order to set an optimal splicing condition for each timing of changing a fiber pitch is not necessary, and it is possible to suppress a loss of operation time.

Moreover, according to the first embodiments, the image processor 21 automatically acquires the fiber pitches of the optical fibers F1 and F2, and the splicing condition processor 22 automatically sets the splicing condition in accordance with the fiber pitch. Consequently, an optimal splicing condition in accordance with the fiber pitch is automatically set only by attaching the optical fibers F1 and F2 to the optical fiber fusion splicer 10. For this reason, it is not necessary for an operator handling the optical fiber fusion splicer 10 to manually set the splicing condition, and an error in setting due to the operator can be prevented.

Furthermore, in the optical fiber fusion splicing method according to the first embodiments, before fusion-splicing the optical fibers F1 and the optical fibers F2 (before the optical fibers F1 and F2 are in contact with each other and combined together), the splicing condition is set. Therefore, it is possible to fusion-splice the optical fibers F1 and the optical fibers F2 in a shorter amount of time. Additionally, the optical fibers F1 and the optical fibers F2 can be spliced with a high degree of quality. Hereinbelow, this point will be described.

For example, when fusion splicing of the optical fibers F1 and the optical fibers F2 is carried out, if electric discharge is started in the condition without considering the fiber pitch before the optical fibers F1 and F2 are in contact with each other and combined together, the amount of heat to be received by the optical fibers F1 and F2 due to electric discharge is inappropriate. Consequently, a melted state of the end of the optical fiber F1 and the end of the optical fiber F2 becomes excessive or insufficient immediately before the fusion, and splicing quality is degraded.

In contrast, in the case of setting the splicing condition in advance before the optical fibers F1 are fusion-spliced to the optical fibers F2, the amount of the received heat due to electric discharge becomes appropriate before the optical fibers F1 and F2 are in contact with each other and combined together. Accordingly, a melted state of the end of the optical fiber F1 and the end of the optical fiber F2 becomes appropriate immediately before the fusion. As a result, it is possible to splice the optical fibers F1 and the optical fibers F2 with a high degree of quality.

In the optical fiber fusion splicer 10 according to the first embodiments, the information representing the relationship between the fiber pitch and the splicing condition which is stored in the storage 23 may be, for example, an approximate formula representing a relationship between a fiber pitch and intensity of electric discharge (current value, voltage, electric power value, or the like). In this case, the splicing condition processor 22 sets the fiber pitch acquired by the image processor 21 as an input parameter, determines the set value of intensity of electric discharge using the approximate formula, and therefore can set the splicing condition. In the case of determining the set value of intensity of electric discharge using the approximate formula, it is possible to set the splicing condition with a high degree of accuracy as compared with the case of determining the set value of intensity of electric discharge using the table. That is, it is possible to carry out fusion splicing of the optical fibers F1 and F2 under a further appropriate splicing condition.

Second Embodiments

Next, an optical fiber fusion splicer according to second embodiments of the invention will be described mainly with reference to FIGS. 11 and 12. In the following explanation, identical reference numerals are used for the elements which have already been explained, and duplicative explanations are omitted.

Figure 11:
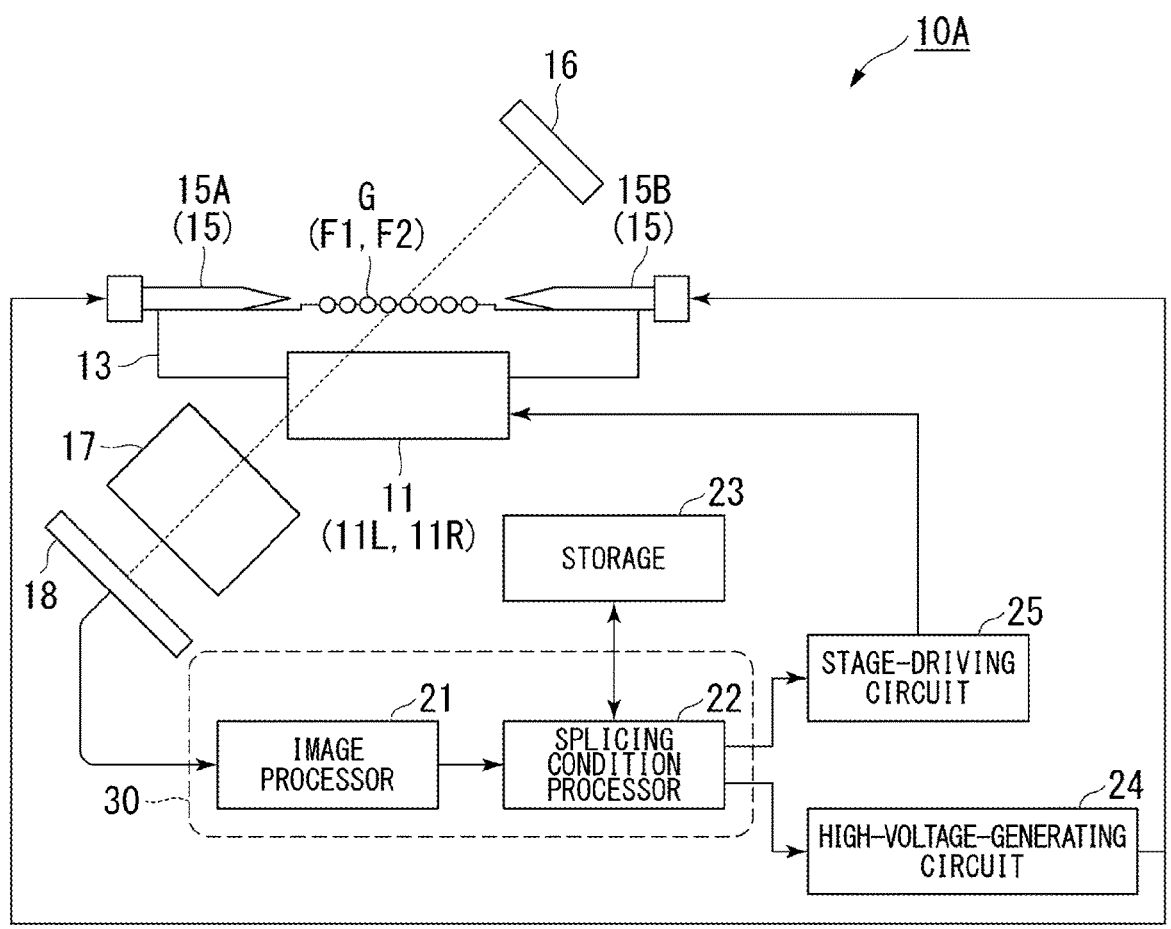
FIG. 11 is a block diagram explaining a function of an optical fiber fusion splicer according to second embodiments.

An optical fiber fusion splicer 10A according to the second embodiments shown in FIG. 11 includes a stage-driving circuit 25 in addition to the same configuration as the first embodiments (movable stages 11L and 11R, the fiber holder 12L, 12R, the groove-formed unit 13, the fiber clamp 14L, 14R, the discharge electrodes 15A, 15B, the lighting part 16, the lens 17, the camera 18, the image processor 21, the splicing condition processor 22, the storage 23, and the high-voltage-generating circuit 24).

The stage-driving circuit 25 is a circuit that drives the movable stages 11L and 11R. The stage-driving circuit 25 controls movement of the movable stages 11L and 11R based on the splicing condition output from the splicing condition processor 22.

In the optical fiber fusion splicer 10A according to the second embodiments, similar to the case of the first embodiments, the information representing the relationship between the fiber pitch and the splicing condition is stored in the storage 23. In the second embodiments, as shown in FIG. 12, the information representing the relationship between the fiber pitch and the splicing condition is shown in a table TB2 in which a fiber pitch and a splicing condition correspond to each other. In the table TB2, splicing conditions which are different from each other are set for each fiber pitch.

Figure 12:
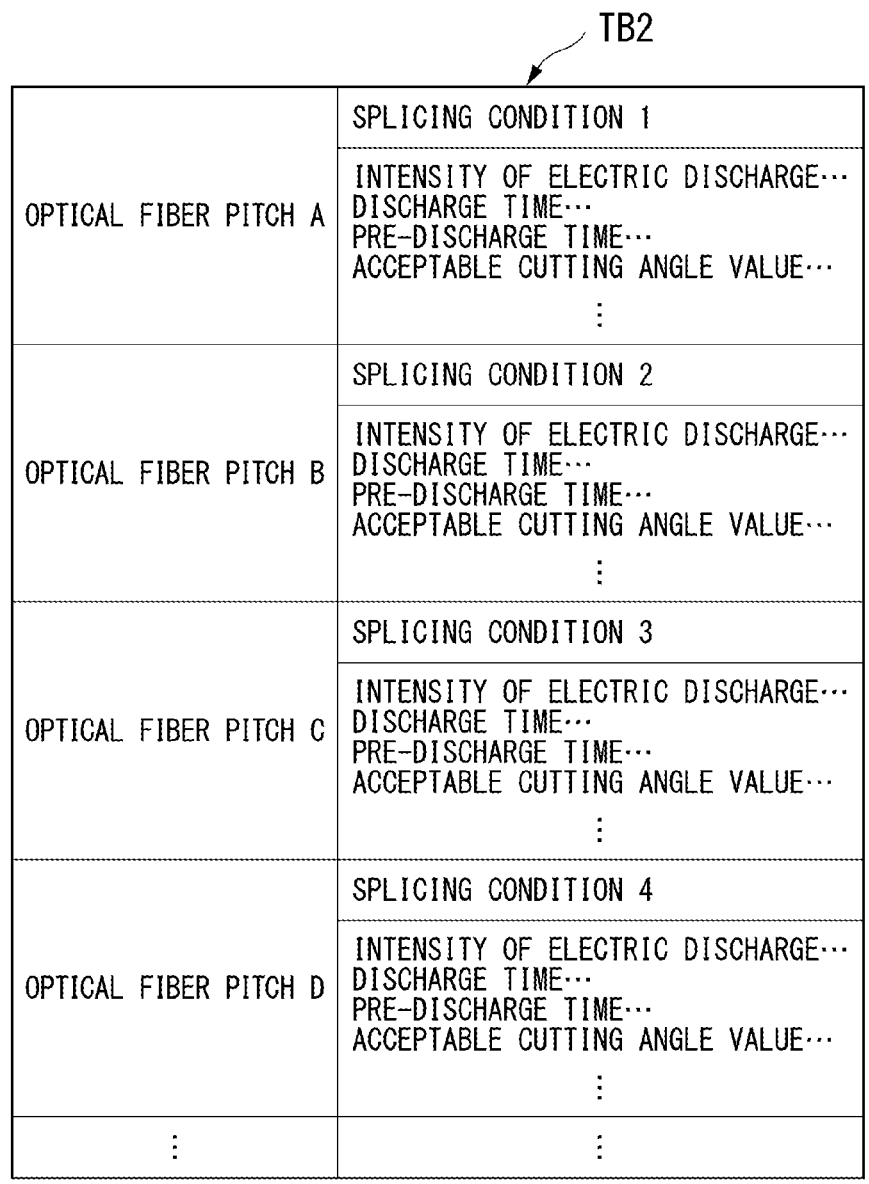
FIG. 12 is a view showing an example of a table that represents relationships between fiber pitches and splicing conditions in the optical fiber fusion splicer according to the second embodiments.

In the table TB2 shown in FIG. 12, the splicing condition includes a plurality of elements such as intensity of electric discharge, a discharge time, a pre-discharge time, an acceptable cutting angle value, or the like (elements associated with fusion splicing). The intensity of electric discharge is a current value, a voltage value, an electric power value, or the like which is described in the first embodiments. The discharge time is a length of time of discharge between the pair of the discharge electrodes 15 when the optical fibers F1 are fusion-spliced to the optical fibers F2. The pre-discharge time is a length of time from when the electric discharge is started to fusion-splice the optical fibers F1 and the optical fibers F2 until when the optical fibers F1 and the optical fibers F2 are butt-jointed to each other. The acceptable cutting angle value is an acceptable range of a cutting angle at the end faces of the glass parts G1 and G2 of the optical fibers F1 and F2 which are butt-jointed when fusion-splicing is carried out. In the case in which the cutting angles at the end faces of the glass parts G1 and G2 are out of the acceptable range, since poor connection between the optical fibers F1 and F2 is very likely to occur, the fusion splicing may not be carried out.

Note that, the splicing condition may include, for example, a set value of a fiber gap. The fiber-gap set value is a set value of the distance (gap) between the optical fibers F1 and the optical fibers F2 immediately before the fusion splicing (electric discharge) is started.

Furthermore, the splicing condition of the table TB2 shown in FIG. 12 may include elements which are not associated with fusion splicing of the optical fibers F1 and F2. The "elements which are not associated with fusion splicing" included in the splicing condition may be, for example, a fiber pitch, the kind of optical fibers F1 and F2 corresponding to a fiber pitch, or may be an acceptable value of a connection loss after fusion-splicing the optical fibers F1 and F2, and an acceptable value of an amount of displacement of the axes of the optical fibers F1 and F2 which were fusion-spliced.

Similar to the table TB1 according to the first embodiments, the table TB2 shown in FIG. 12 can be prepared, for example, based on the results by searching an optimal splicing condition (particularly, "elements which are associated with fusion splicing") in advance by experiments or the like with regard to a plurality of kinds of fiber pitches which are assumed to be practically used.

The splicing condition processor 22 sets the splicing condition by reading out, from the table TB2 shown in FIG. 12, the splicing condition corresponding to the fiber pitch acquired by the image processor 21. For example, in the case in which the fiber pitch acquired by the image processor 21 is "fiber pitch A", the splicing condition processor 22 reads out "splicing condition 1" from the table TB2 shown in FIG. 12. The element of the splicing condition which is read out from the table TB2 shown in FIG. 12 by the splicing condition processor 22 may be all elements included in the splicing condition or may be part of the elements included in the splicing condition.

The splicing condition processor 22 may set an optimal splicing condition by determining the splicing condition by calculation. For example, a calculation formula including parameters such as air temperature, atmosphere pressure, degree of humidity, or the like in addition to the fiber pitch is determined in advance by experiments or the like, and an optimal splicing condition may be calculated and set using the calculation formula when fusion splicing is practically carried out.

The splicing condition processor 22 adequately outputs the read-out elements of the splicing condition to the high-voltage-generating circuit 24 or the stage-driving circuit 25. Specifically, the intensity of electric discharge or the discharge time of the elements of the splicing condition is output to the high-voltage-generating circuit 24. The high-voltage-generating circuit 24 generates electric discharge between the pair of the discharge electrodes 15 in accordance with the intensity of electric discharge or the electric discharge which is output from the splicing condition processor 22.

Furthermore, the pre-discharge time or the fiber-gap set value of the elements of the splicing condition is output to the stage-driving circuit 25. The stage-driving circuit 25 moves the movable stages 11L and 11R in accordance with the pre-discharge time or the fiber-gap set value which is output from the splicing condition processor 22.

In the case in which the splicing condition read out from the splicing condition processor 22 includes the cutting angle value, the image processor 21 may acquire the cutting angles of the end faces of the glass parts G1 and G2 of the optical fibers F1 and F2 in advance based on the image obtained from the camera 18. Accordingly, the splicing condition processor 22 can determine whether or not the acquired cutting angle is within the acceptable cutting angle value. In the case in which the splicing condition processor 22 determines that the acquired cutting angle is within the acceptable cutting angle value, the splicing condition processor 22 outputs a signal indicating start or continuing of operation of fusion splicing of the optical fibers F1 and F2, information according to permission of operation of fusion splicing of the optical fibers F1 and F2, or a signal for notification to the operator handling the optical fiber fusion splicer 10A. On the other hand, in the case in which the splicing condition processor 22 determines that the acquired cutting angle is not within the acceptable cutting angle value, the splicing condition processor 22 outputs a signal indicating stop of operation of fusion splicing of the optical fibers F1 and F2, information according to a stopping operation of fusion splicing of the optical fibers F1 and F2, or a signal for notification to the operator.

The element of the splicing condition (particularly, "elements which are not associated with fusion splicing") read out from the splicing condition processor 22 may be output to, for example, a display (not shown in the drawings) that displays information such as an image or the like. In this case, as a variety of information regarding the optical fibers F1 and F2 to be fusion-spliced (for example, the type of the optical fibers F1 and F2, an acceptable value of a connection loss, an acceptable value of an amount of displacement of the axis, or the like) is displayed on the display, the operator handling the optical fiber fusion splicer 10 can easily check the information. As a result, it is possible to effectively carry out the operation of fusion splicing of the optical fibers F1 and F2.

An optical fiber fusion splicing method using the optical fiber fusion splicer 10A according to the second embodiments is substantially the same as that of the first embodiments.

However, in the fusion splicing method according to the second embodiments, the splicing condition processor 22 adequately outputs the various elements of the read-out splicing condition to the high-voltage-generating circuit 24, the stage-driving circuit 25, the display, or the like after reading out the splicing condition corresponding to the acquired fiber pitch from the table TB2 stored in the storage 23.

For example, in the case in which the splicing condition that is output from the splicing condition processor 22 includes the intensity of electric discharge or the discharge time, the high-voltage-generating circuit 24 generates electric discharge between the pair of the discharge electrodes 15 at a predetermined intensity of electric discharge for a predetermined amount of time in accordance with the intensity of electric discharge or the discharge time.

In the case in which the splicing condition that is output from the splicing condition processor 22 includes the pre-discharge time, the stage-driving circuit 25 moves the movable stages 11L and 11R at a predetermined timing in accordance with the pre-discharge time and causes the glass parts G1 of the optical fibers F1 to be butt-jointed to the glass parts G2 of the optical fibers F2.

In the case in which the splicing condition that is output from the splicing condition processor 22 includes the acceptable cutting angle value, the splicing condition processor 22 compares the cutting angles of the end faces of the glass parts G1 and G2 acquired by the image processor 21 to the acceptable cutting angle value, and determines whether the fusion-splicing operation of the optical fibers F1 and F2 is started or stopped.

In the case in which the splicing condition that is output from the splicing condition processor 22 includes the fiber-gap set value, the stage-driving circuit 25 moves the movable stages 11L and 11R in accordance with the fiber-gap set value before starting the electric discharge and controls the distance between the glass parts G1 of the optical fibers F1 and the glass parts G2 of the optical fibers F2.

According to the optical fiber fusion splicer 10A of the second embodiments and the optical fiber fusion splicing method using the optical fiber fusion splicer 10A, the same effect as that of the first embodiments is obtained.

Furthermore, according to the second embodiments, the splicing condition corresponding to the fiber pitch includes a plurality of elements such as the intensity of electric discharge, the discharge time, the pre-discharge time, the acceptable cutting angle value, or the like. Consequently, it is possible to fusion-splice the optical fibers F1 and the optical fibers F2 by a further appropriate splicing condition. Accordingly, it is possible to further suppress a connection loss of the optical fibers F1 and F2 to be small after fusion splicing.

As described above, the detail of the invention is described; however, the invention is not limited to the above embodiments, and various modifications may be made without departing from the scope of the invention.

In the optical fiber fusion splicer and the fusion splicing method of the invention, based on the image in addition to calculation of the fiber pitch, the image processor 21 may determine the number of the optical fibers F1 and F2 (glass parts G1 and G2) which align in the front-back direction Y. Moreover, the splicing condition processor 22 may set the splicing condition corresponding to the acquired fiber pitch and the determined number of the optical fibers F1 and F2. Specifically, the splicing condition processor 22 needs to obtain the splicing condition based on the information representing the relationship of the fiber pitch, the number of the optical fibers F1 and F2, and the splicing condition.

The information representing the relationship of the fiber pitch, the number of the optical fibers F1 and F2, and the splicing condition may be shown in, for example, a table TB3 in FIG. 13. Similar to the tables TB1 and TB2 shown in FIGS. 8 and 12 as an example, the table TB3 shown in FIG. 13 may be stored in the storage 23. In the table TB3 shown in FIG. 13, the splicing conditions are considered such that the fiber pitches correspond to the number of the optical fibers F1 and F2. That is, an individual splicing condition in accordance with a combination of each number of the optical fibers F1 and F2 and the plurality of kinds of fiber pitches is set. However, in the case in which the number of the optical fibers F1 and F2 is one, the fiber pitch is not present, and therefore the corresponding splicing condition is only one. In the table TB3 shown in FIG. 13 as an example, although the same current value (intensity of electric discharge) as the first embodiments is adopted as the splicing condition, the splicing condition shown in the table TB3 is not limited to the current value. For example, like the second embodiments, the splicing condition including a plurality of elements may be adopted.

As shown in FIG. 13 as an example, in the case of setting the splicing condition in which both the fiber pitch and the number of the optical fibers F1 and F2 which correspond to each other are considered, even if the number of the optical fibers F1 and F2 is changed as well as the fiber pitch, it is possible to fusion-splice the optical fibers F1 and the optical fibers F2 by an optimal splicing condition.

In the optical fiber fusion splicer and the fusion splicing method of the invention, based on the image in addition to calculation of the fiber pitch, the image processor 21 may acquire diameters of the optical fibers F1 and F2 (glass parts G1 and G2).

Furthermore, the splicing condition processor 22 may set the splicing condition corresponding to the acquired fiber pitch and the diameters of the optical fibers F1 and F2. Specifically, the splicing condition processor 22 needs to obtain the splicing condition based on information representing a relationship of the fiber pitch, the diameters of the optical fibers F1 and F2, and the splicing condition.

That is, the image processor 21 acquires a diameter of at least one of the optical fibers F1 and a diameter of at least one of the optical fibers F2 based on the image. In other words, the image processor 21 acquires both diameters of the optical fibers F1 and F2. the splicing condition processor 22 sets the splicing condition corresponding to the fiber pitch of the optical fibers F1, the fiber pitch of the optical fibers F2, the diameters of the optical fibers F1, and the diameters of the optical fibers F2 by selection or calculation thereof.

Furthermore, as a modified example 1, the image processor 21 may acquire the diameter of at least one of the optical fibers F1 based on the image. In this case, the splicing condition processor 22 sets the splicing condition corresponding to the fiber pitch of the optical fibers F1 and the diameters of the optical fibers F1 by selection or calculation thereof.

Furthermore, as a modified example 2, the image processor 21 may acquire the diameter of at least one of the optical fibers F2 based on the image. In this case, the splicing condition processor 22 sets the splicing condition corresponding to the fiber pitch of the optical fibers F2 and the diameters of the optical fibers F2 by selection or calculation thereof.

The information representing the relationship of the fiber pitch, the diameters of the optical fibers F1 and F2, and the splicing condition may be shown in, for example, a table TB4 in FIG. 14. The table TB4 of FIG. 14 may be stored in the storage 23. In the table TB4 shown in FIG. 14, the splicing conditions are considered such that the fiber pitches correspond to the diameters of the optical fibers F1 and F2. That is, an individual splicing condition in accordance with a combination of each diameter of the optical fibers F1 and F2 and the plurality of kinds of fiber pitches is set. In the table TB4 shown in FIG. 14, although the same current value (intensity of electric discharge) as the first embodiments is adopted as the splicing condition, the splicing condition of the invention is not limited to the current value. For example, like the second embodiments, the splicing condition including a plurality of elements may be adopted.

As shown in FIG. 14 as an example, in the case of setting the splicing condition in which both the fiber pitch and the diameters of the optical fibers F1 and F2 which correspond to each other are considered, even if the diameters of the optical fibers F1 and F2 are changed as well as the fiber pitch, it is possible to fusion-splice the optical fibers F1 and the optical fibers F2 by an optimal splicing condition.

In the optical fiber fusion splicer and the fusion splicing method of the invention, the splicing condition may be set in consideration of three points of, for example, the fiber pitch, the number of the optical fibers F1 and F2, and the diameters of the optical fibers F1 and F2.

In the fusion splicing method of the invention, a configuration of acquiring a fiber pitch, a diameter of the optical fibers F1 and F2, or determining the number of the optical fibers F1 and F2 based on the image, a configuration of setting a splicing condition corresponding to the acquired fiber pitch or diameter and the determined number is not limited to the image processor 21 or the splicing condition processor 22 and may be optionally selected.

A part of the function of the optical fiber fusion splicer may be achieved by, for example, a condition-setting device. The condition-setting device includes a capturing part that captures an image including the optical fibers F1 and F2, a calculation part that acquires the fiber pitch based on the image, and a processor that obtains a splicing condition in accordance with the calculation result. The capturing part and the calculation part may be achieved by, for example, the image processor 21 shown in FIGS. 5 and 11. Moreover, the processor may be realized by, for example, the splicing condition processor 22 shown in FIGS. 5 and 11. Furthermore, as shown in FIGS. 5 and 11 as an example, the condition-setting device 30 may be configured to include the functions of the image processor 21 and the splicing condition processor 22. The condition-setting device 30 is, for example, an electrical circuit or a computer including an electronic circuit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 10, 10A optical fiber fusion splicer
11, 11L, 11R movable stage
13 groove-formed unit
15, 15A, 15B discharge electrode
15AE, 15BE electrode end
16 lighting part
17 lens
18 camera
21 image processor
22 splicing condition processor
24 high-voltage-generating circuit
30 condition-setting device
F1, F2 optical fiber
G1, G2 glass part
MF1 first mass fiber
MF2 second mass fiber

The invention claimed is:

1. An optical fiber fusion splicer comprising:
a replaceable groove-formed unit having:
first positioning grooves, separated from each other by an equal distance, on which first optical fibers are disposed; and second positioning grooves, separated from each other by an equal distance, on which second optical fibers are disposed, wherein
the first optical fibers constitute a first mass fiber and have first glass parts, and
the second optical fibers constitute a second mass fiber and have second glass parts;
a lighting part that illuminates, with light, the first optical fibers and the second optical fibers;
a lens that condenses the light passing through the first glass parts and the second glass parts;
a camera that captures an image formed by the lens;
a pair of discharge electrodes that heat and melt, by electric discharge, the first glass parts and the second glass parts;
a high-voltage-generating circuit that generates an electric discharge between the pair of the discharge electrodes;
a movable stage that:
moves the first optical fibers in a longitudinal direction of the first mass fiber, and
moves the second optical fibers in a longitudinal direction of the second mass fiber;
an image processor that, based on the image captured by the camera, acquires one or both of:
a fiber pitch of the first optical fibers based on:
a distance between two of the first optical fibers disposed at both ends of the first mass fiber in a front-back direction in which the first optical fibers are disposed, and
a number of the first optical fibers, and
a fiber pitch of the second optical fibers based on:
a distance between two of the second optical fibers disposed at both ends of the second mass fiber in the front-back direction in which the second optical fibers are disposed, and
a number of the second optical fibers; and
a splicing condition processor that sets a splicing condition corresponding to the one or both of the acquired fiber pitches by selection or calculation thereof.

2. The optical fiber fusion splicer according to claim 1, wherein
the image processor determines a number of the first optical fibers and a number of the second optical fibers based on the image, and
the splicing condition processor sets the splicing condition corresponding to:
the acquired fiber pitch of the first optical fibers,
the acquired fiber pitch of the second optical fibers,
the number of the first optical fibers, and
the number of the second optical fibers.

3. The optical fiber fusion splicer according to claim 1, wherein
based on the image, the image processor acquires:
a diameter of at least one of the first optical fibers, or
a diameter of at least one of the second optical fibers, and
the splicing condition processor:
sets the splicing condition corresponding to:
the acquired fiber pitch of the first optical fibers, and
the diameter of the at least one of the first optical fibers, or
sets the splicing condition corresponding to:
the acquired fiber pitch of the second optical fibers, and
the diameter of the at least one of the second optical fibers.

4. The optical fiber fusion splicer according to claim 1, wherein
based on the image, the image processor acquires:
a diameter of at least one of the first optical fibers, and
a diameter of at least one of the second optical fibers, and
the splicing condition processor sets the splicing condition corresponding to:
the acquired fiber pitch of the first optical fibers,
the acquired fiber pitch of the second optical fibers,
the diameter of the at least one of the first optical fibers, and
the diameter of the at least one of the second optical fibers.

5. An optical fiber fusion splicing method for fusion-splicing a first mass fiber and a second mass fiber using an optical fiber fusion splicer comprising: a replaceable groove-formed unit having: first positioning grooves, separated from each other by an equal distance, on which first optical fibers are disposed, and second positioning grooves, separated from each other by an equal distance, on which second optical fibers are disposed, the first optical fibers constituting a first mass fiber and having first glass parts, the second optical fibers constituting a second mass fiber and having second glass parts; a lighting part that illuminates, with light, the first optical fibers and the second optical fibers; a lens that condenses the light passing through the first glass parts and the second glass parts; a camera that captures an image formed by the lens; a pair of discharge electrodes that heat and melt, by electric discharge, the first glass parts and the second glass parts; a high-voltage-generating circuit that generates an electric discharge between the pair of the discharge electrodes; and a movable stage that: moves the first optical fibers in a longitudinal direction of the first mass fiber, and moves the second optical fibers in a longitudinal direction of the second mass fiber, the method comprising:
acquiring, based on the image captured by the camera, one or both of:
a fiber pitch of the first optical fibers based on:
a distance between two of the first optical fibers disposed at both ends of the first mass fiber in a front-back direction in which the first optical fibers are disposed, and
a number of the first optical fibers, and
a fiber pitch of the second optical fibers based on:
a distance between two of the second optical fibers disposed at both ends of the second mass fiber in a front-back direction in which the second optical fibers are disposed, and
a number of the second optical fibers; and
setting a splicing condition corresponding to the one or both of the acquired fiber pitches by selection or calculation thereof.

6. The method according to claim 5, wherein the splicing condition is set before the first mass fiber is fusion-spliced to the second mass fiber.

7. The method according to claim 5, wherein
a number of the first optical fibers and a number of the second optical fibers are determined based on the image, and
the splicing condition corresponds to:
the acquired fiber pitch of the first optical fibers,
the acquired fiber pitch of the second optical fibers,
the number of the first optical fibers, and
the number of the second optical fibers.

8. The method according to claim 5, wherein
a diameter of at least one of the first optical fibers or a diameter of at least one of the second optical fibers is acquired based on the image, and
the splicing condition corresponds to:
the acquired fiber pitch of the first optical fibers and the diameter of the at least one of the first optical fibers, or
the acquired fiber pitch of the second optical fibers and the diameter of the at least one of the second optical fibers.

9. The method according to claim 5, wherein
a diameter of at least one of the first optical fibers and a diameter of at least one of the second optical fibers are acquired based on the image, and
the splicing condition corresponds to:
the acquired fiber pitch of the first optical fibers,
the acquired fiber pitch of the second optical fibers,
the diameter of the at least one of the first optical fibers, and
the diameter of the at least one of the second optical fibers.

10. The method according to claim 6, wherein
a number of the first optical fibers and a number of the second optical fibers are determined based on the image, and
the splicing condition corresponds to:
the acquired fiber pitch of the first optical fibers,
the acquired fiber pitch of the second optical fibers,
the number of the first optical fibers, and
the number of the second optical fibers.

11. The method according to claim 6, wherein
a diameter of at least one of the first optical fibers or a diameter of at least one of the second optical fibers is acquired based on the image, and
the splicing condition corresponds to:
the acquired fiber pitch of the first optical fibers and the diameter of the at least one of the first optical fibers, or
the acquired fiber pitch of the second optical fibers and the diameter of the at least one of the second optical fibers.

12. The method according to claim 6, wherein
a diameter of at least one of the first optical fibers and a diameter of at least one of the second optical fibers are acquired based on the image, and
the splicing condition corresponds to:
the acquired fiber pitch of the first optical fibers,
the acquired fiber pitch of the second optical fibers,
the diameter of the at least one of the first optical fibers, and
the diameter of the at least one of the second optical fibers.

13. The optical fiber fusion splicer according to claim 1, wherein
the splicing condition corresponding to the acquired fiber pitch is any one of:
intensity of the electric discharge between the pair of the discharge electrodes;
discharge time of the electric discharge;
pre-discharge time between start of the electric discharge and butt-joint of the first optical fibers and the second optical fibers;
cutting angle at end faces of the first and second glass parts;
fiber gap of the first optical fibers and the second optical fibers immediately before the start of the electric discharge;
type of the first optical fibers and the second optical fibers corresponding to the acquired fiber pitch;
connection loss after fusion-splicing the first optical fibers and the second optical fibers; and
displacement amount of axes of the fusion-spliced first optical fibers and second optical fibers.

14. The method according to claim 5, wherein
the splicing condition corresponding to the acquired fiber pitch is any one of:
intensity of the electric discharge between the pair of the discharge electrodes;
discharge time of the electric discharge;
pre-discharge time between start of the electric discharge and butt-joint of the first optical fibers and the second optical fibers;
cutting angle at end faces of the first and second glass parts;
fiber gap of the first optical fibers and the second optical fibers immediately before the start of the electric discharge;
type of the first optical fibers and the second optical fibers corresponding to the acquired fiber pitch;
connection loss after fusion-splicing the first optical fibers and the second optical fibers; and
displacement amount of axes of the fusion-spliced first optical fibers and second optical fibers.

15. The method according to claim 6, wherein
the splicing condition corresponding to the acquired fiber pitch is any one of:
intensity of the electric discharge between the pair of the discharge electrodes;
discharge time of the electric discharge;
pre-discharge time between start of the electric discharge and butt-joint of the first optical fibers and the second optical fibers;
cutting angle at end faces of the first and second glass parts;
fiber gap of the first optical fibers and the second optical fibers immediately before the start of the electric discharge;
type of the first optical fibers and the second optical fibers corresponding to the acquired fiber pitch;
connection loss after fusion-splicing the first optical fibers and the second optical fibers; and
displacement amount of axes of the fusion-spliced first optical fibers and second optical fibers.

16. The optical fiber fusion splicer according to claim 1, wherein
when discharge occurs, a temperature region is classified as a high temperature region, a medium-temperature region, and a low-temperature region, due to the electric discharge generated between the pair of the discharge electrodes, and
the splicing condition processor sets the splicing condition such that all of the first optical fibers and the second optical fibers are located in the medium-temperature region.

17. The method according to claim 5, wherein
when discharge occurs, a temperature region is classified as a high temperature region, a medium-temperature region, and a low-temperature region, due to the electric discharge generated between the pair of the discharge electrodes, and the setting the splicing condition comprises positioning all of the first optical fibers and the second optical fibers in the medium-temperature region.

18. The method according to claim 6, wherein when discharge occurs, a temperature region is classified as a high temperature region, a medium-temperature region, and a low-temperature region, due to the electric discharge generated between the pair of the discharge electrodes, and the setting the splicing condition comprises positioning all of the first optical fibers and the second optical fibers in the medium-temperature region.

* * * * *